United States Patent [19]
Suzuki et al.

[11] Patent Number: 6,002,805
[45] Date of Patent: Dec. 14, 1999

[54] IMAGE READING APPARATUS AND A METHOD FOR DETECTING OPEN/CLOSE OF AN ORIGINAL FEEDING UNIT IN THE IMAGE READING APPARATUS

[75] Inventors: Akio Suzuki; Kimichika Tanoue; Keiichi Saito, all of Kawasaki, Japan

[73] Assignee: Fujitsu Limited, Kawasaki, Japan

[21] Appl. No.: 08/680,963

[22] Filed: Jul. 16, 1996

[30] Foreign Application Priority Data

Jan. 12, 1996  [JP]  Japan ..................................... 8-004254

[51] Int. Cl.$^6$ ................. G06K 9/38; H04N 1/04
[52] U.S. Cl. ................ 382/270; 358/400; 358/474; 358/498
[58] Field of Search ............................ 382/270; 358/441, 358/400, 401, 471, 474, 483, 494, 498, 296, 500, 501

[56] References Cited

U.S. PATENT DOCUMENTS 4,132,977  1/1979  Nagano ................................. 382/275
5,568,281  10/1996  Kochis ................................. 358/475

Primary Examiner—Thomas D. Lee
Attorney, Agent, or Firm—Nikaido Marmelstein Murray & Oram LLP

[57] ABSTRACT

An image reading apparatus suitable for use as a facsimile apparatus, a coping apparatus or the like, and a method for detecting open/close of an original feeding unit in the image reading apparatus. The image reading apparatus has an original feeding unit openable and closable for feeding an original set, a light radiating unit for radiating lights on the original fed, an image sensor disposed on a feeding route for detecting an image of the original on the basis of reflected light from the original, a binary information converting unit for converting detecting image information from the image sensor into binary information, and a data processing unit using the binary information from the binary information converting unit as read image information on the occasion of image reading, while using it as information used to detect an open/close state of the original feeding unit on the occasion excepting the image reading, thereby detecting an open/close state of the original feeding unit without causing an increase of the number of parts of the apparatus.

18 Claims, 14 Drawing Sheets

IMAGE READING APPARATUS AND A METHOD FOR DETECTING OPEN/CLOSE OF AN ORIGINAL FEEDING UNIT IN THE IMAGE READING APPARATUS

BACKGROUND OF THE INVENTION

The present invention relates to an image reading apparatus suitable for use as a facsimile apparatus, a copying apparatus or the like, and a method for detecting open/close of an original feeding unit in the image reading apparatus.

An image reading apparatus used to read information drawn on an original as image information (including image information or character information) such as a facsimile, an image scanner or the like has been developed in recent years.

In such image reading apparatus, an original set in, for example, a hopper is drawn out one by one and fed on a feeding route so that image information of the original is read on the feeding route.

If a so-called jam that an original jams on the above-mentioned feeding route or the like occurs, the operator opens an openable and closable lid unit constituting an original feeding unit for feeding the original, thereby removing the original jamming on the feeding route.

In the above-mentioned image reading apparatus, lights are radiated on the original fed on the feeding route to read image information on the basis of reflected lights from the original. Therefore, it is necessary to shield disturbing lights from the outside during an image reading operation. The above-mentioned lid unit is also required to be closed since the disturbing lights prevent image information of the original from being appropriately read if the lid unit is in an open state.

In order to prevent the lid unit from being in an open state during the above-mentioned image reading, a general image reading apparatus is provided with an exclusive microswitch served to detect an open/close state of the lid unit so as to notify the open/close state to the operator.

Such general image reading apparatus has, however, a problem that the number of parts increases so as to cause an increase of unnecessary cost required to constitute the apparatus or complicate a structure of the apparatus since the apparatus has an exclusive microswitch to detect the open/close state of the lid unit.

SUMMARY OF THE INVENTION

In the light of the above problem, an object of the present invention is to provide an image reading apparatus and a method for detecting open/close of an original feeding unit in the image reading apparatus, which enable detection of an open/close state of the original feeding unit without causing an increase of the number of parts of the apparatus.

The present invention therefore provides an image reading apparatus comprising an original feeding unit openable and closable for feeding an original set, a light radiating unit for radiating lights on the original fed by the original feeding unit, an image sensor disposed on a feeding route of the original feeding unit for detecting an image of the original on the basis of reflected lights from the original, a binary information converting unit for converting detected image information from the image sensor into binary information, and a data processing unit using the binary information from the binary information converting unit as read image information on the occasion of image reading, and using the binary information as information used to detect an open/close state of the original feeding unit on the occasion excepting the image reading.

The present invention further provides a method for detecting open/close of an original feeding unit in an image reading apparatus comprising the original feeding unit openable and closable for feeding an original set, a light radiating unit for radiating lights on the original fed by the original feeding unit, an image sensor disposed on a feeding route of the original feeding unit for detecting an image of the original on the basis of reflected lights from the original, a binary information converting unit for converting detected image information from the image sensor into binary information, and an original-back supporting unit disposed in a position across the feeding route in which the original-back supporting unit may reflect lights from the light radiating unit to the image sensor, the method comprising the steps of using binary information converted on the basis of magnitudes of the detected image information from the image sensor and a slice level set in the binary information converting unit as read image information on the occasion of image reading, and comparing the detected image information obtained while the light radiating unit is turned on with the slice level in the binary information converting unit on the occasion excepting the image reading, if the detected image information is smaller than or below the slice level, detecting that the original feeding unit is in an open state, whereas if the detected image information is above or larger than the slice level, detecting that the original feeding unit is in a close state.

The present invention still further provides a method for detecting open/close of an original feeding unit in an image reading apparatus comprising the original feeding unit openable and closable for feeding an original set, a light radiating unit for radiating lights on the original fed by the original feeding unit, an image sensor disposed on a feeding route of the original feeding unit for detecting an image of the original on the basis of reflected lights from the original, a binary information converting unit for converting detected image information from the image sensor into binary information, and an original-back supporting unit disposed in a position across the feeding route in which the original-back supporting unit may reflect lights from the light radiating unit to the image sensor, the method comprising the steps of using binary information converted on the basis of magnitudes of the detected image information from the image sensor and a slice level set in the binary information converting unit as read image information on the occasion of image reading, comparing the detected image information obtained while the light radiating unit is turned off with the slice level in the binary information converting unit on the occasion excepting th image reading, if the detected image information is larger than or above the slice level, detecting that the original feeding unit is in an open state, whereas if the detected image information is below or smaller than the slice level, detecting that the original feeding unit is in a close state.

The present invention still further provides a method for detecting open/close of an original feeding unit in an image reading apparatus comprising the original feeding unit openable and closable for feeding an original set, a light radiating unit for radiating lights on the original fed by the original feeding unit, an image sensor for detecting an image of the original by receiving reflected light from the original in the course of feeding by the original feeding unit, a binary information converting unit for converting detected image information from the image sensor into binary information, in which the binary information from the binary information converting unit is used as read image information on the occasion of image reading, the method comprising the steps of holding a peak value of detected information from the image sensor obtained while the light radiating unit radiates lights in the binary information converting unit, comparing the peak value information with the detected image information from the image sensor obtained while the light radiating unit does not radiate lights, and if the detected image information is approximately equal to the peak value information, detecting that the original feeding unit is in an open state, whereas if the detected image information is smaller than the peak value information, detecting that the original feeding unit is in a close state, on the basis of a result of the comparison from the binary information converting unit on the occasion excepting the image reading.

According to the present invention, the data processing unit generates read image information using detected image information from the image sensor on the occasion of image reading. On the occasion excepting the image reading, the data processing unit uses binary information from the binary information converting unit as information used to detect an open/close state of the original feeding unit. It is therefore possible to detect the open/close state of the original feeding unit using only existing circuits for image processing without causing an increase of the number of parts of the apparatus, suppress an increase of unnecessary cost required to constitute the apparatus, and easily accomplish a hardware structure of the apparatus.

Figure 1:
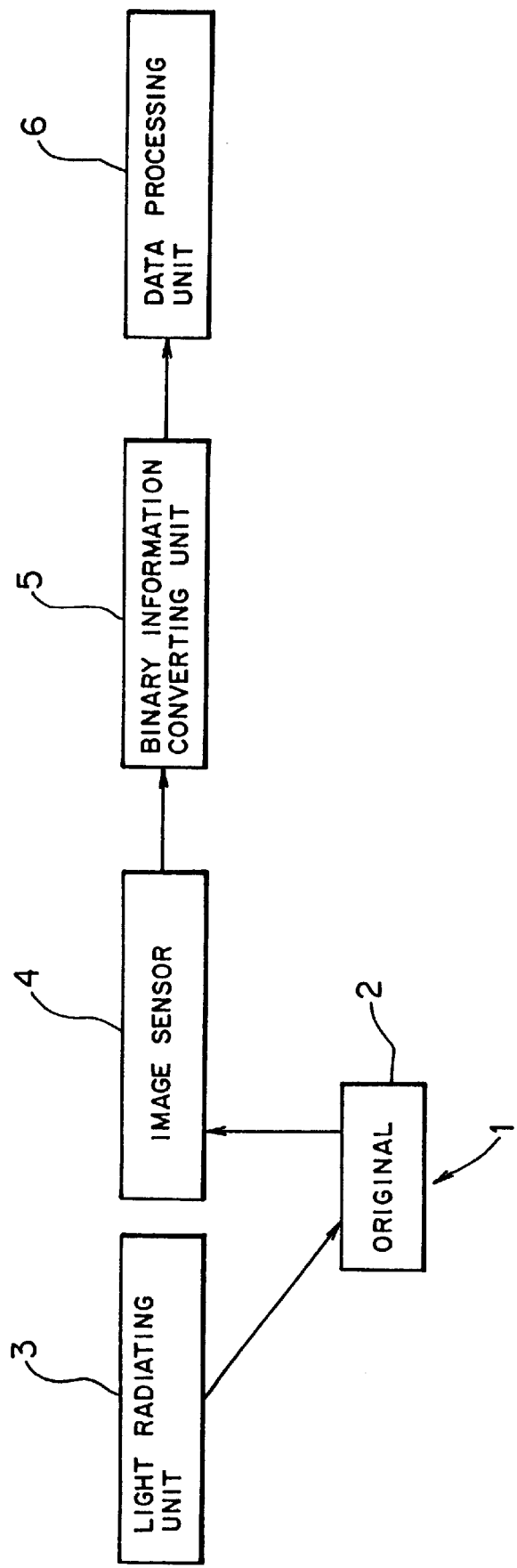
FIG. 1 is a block diagram showing an aspect of this invention.

DESCRIPTION OF THE PREFERRED EMBODIMENTS (a) Description of Aspect of the Present Invention Now, an aspect of this invention will be described referring to the drawings.

FIG. 1 is a block diagram showing a principle of this invention. In FIG. 1, reference numeral 1 denotes an original feeding unit openable and closable for feeding an original 2 set. Reference numeral 3 is a light radiating unit for radiating lights on the original 2 fed by the original feeding unit 1. Reference numeral 4 is an image sensor disposed on a feeding route of the original feeding unit 1 for detecting an image of the original 2 on the basis of reflected lights from the original 2.

Reference numeral 5 denotes a binary information converting unit. The binary information converting unit 5 converts detected image information from the image sensor 4 into binary information. Reference numeral 6 denotes a data processing unit. The data processing unit 6 uses the binary information from the binary information converting unit 5 as read image information on the occasion of image reading. On the occasion excepting the image reading, the data processing unit 6 uses it as information used to detect an open/close state of the original feeding unit 1.

The binary information converting unit 5 has a slice level setting unit for setting a slice level and a comparing unit for comparing the slice level set by the slice level setting unit with the detected image information from the image sensor 4, thereby outputting a result of the comparison from the comparing unit as the binary information.

In the above case, the slice level setting unit may have a register in which the slice level is set in advance. Further, the slice level setting unit may have a peak value holding unit for holding a peak value of the detected information lastly inputted from the image sensor 4, and a voltage dividing unit for dividing a level held in the peak value holding unit, thereby setting a result of the voltage division by the voltage dividing unit as the slice level.

The binary information converting unit 5 may have a light radiating time peak value holding unit for holding a peak value of the detected information from the image sensor 4 obtained while the light radiating unit 3 radiates lights, and a peak value comparing unit for comparing peak value information held in the light radiating time peak value holding unit with the detected information from the image sensor 4 obtained while the light radiating unit 3 does not radiate lights, thereby outputting a result of the comparison by the peak value comparing unit in the binary information converting unit 5 as the binary information.

Further, the image reading apparatus may have an original-back supporting unit disposed in a position across the feeding route in which the original-back supporting unit may reflect lights from the light radiating unit 3 to the image sensor 4, and an entire surface of the original-back supporting unit may be formed with a member being able to reflect lights radiated from the light radiating unit 3 to the image sensor 4.

Alternatively, the image reading apparatus may have an original-back supporting unit disposed in a position across the feeding route in which the original-back supporting unit may reflect lights radiated from the light radiating unit 3 to the image sensor 4, and the original-back supporting unit may have an outer peripheral region of a surface being able to receive lights from the light radiating unit 3 formed with a member which can reflect the lights to the image sensor 4, and an inner region of the outer peripheral region formed with a member which does not reflect the lights to the image sensor 4.

Whereby, binary information converted by the binary information converting unit 5 on the basis of magnitudes of detected image information from the image sensor 4 and a slice level set is used as read image information on the occasion of image reading. On the occasion excepting the image reading, the binary information converting unit 5 compares detected image information obtained while the light radiating unit 3 is turned on with the slice level. If the detected image information is smaller than or below the slice level, it is detected that the original feeding unit 1 is an open state. If the detected image information is above or larger than the slice level, it is detected that the original feeding unit 1 is in a close state.

On the occasion of image reading, binary information converted by the binary information converting unit 5 on the basis of magnitudes of detected image information from the image sensor 4 with a set slice level is used as read image information. On the occasion excepting the image reading, the binary information converting unit 5 compares detected image information obtained while the light radiating unit 3 is turned off with the slice level. If the detected image information is larger than or above the slice level, it is detected that the original feeding unit 1 is in the open state. If the detected image information is below or smaller than the slice level, it is detected that the original feeding unit 1 is in the close state.

The binary information converting unit 5 holds a peak value of detected information from the image sensor 4 obtained while the light radiating unit 3 radiates lights, and compares peak value information with detected image information from the image sensor 4 obtained while the light radiating unit 3 does not radiate lights. On the occasion excepting the image reading, if the detected image information is approximately equal to the peak value information, it is detected from a result of the comparison from the binary information converting unit 5 that the original feeding unit 1 is the open state. If the detected image information is smaller than the peak value information, it is detected that the original feeding unit 1 is in the close state.

According to this invention, the data processing unit generates read image information using detected image information from the image sensor on the occasion of image reading. On the occasion excepting the image reading, binary information from the binary information converting unit is used as information used to detect the open/close state of the original feeding unit. It is therefore possible to detect the open/close state of the original feeding unit using only existing circuits for image processing without causing an increase of the number of parts of the apparatus, suppress an increase of unnecessary cost required to constitute the apparatus, and easily accomplish a hardware structure of the apparatus.

(b) Description of First Embodiment

Figure 2:
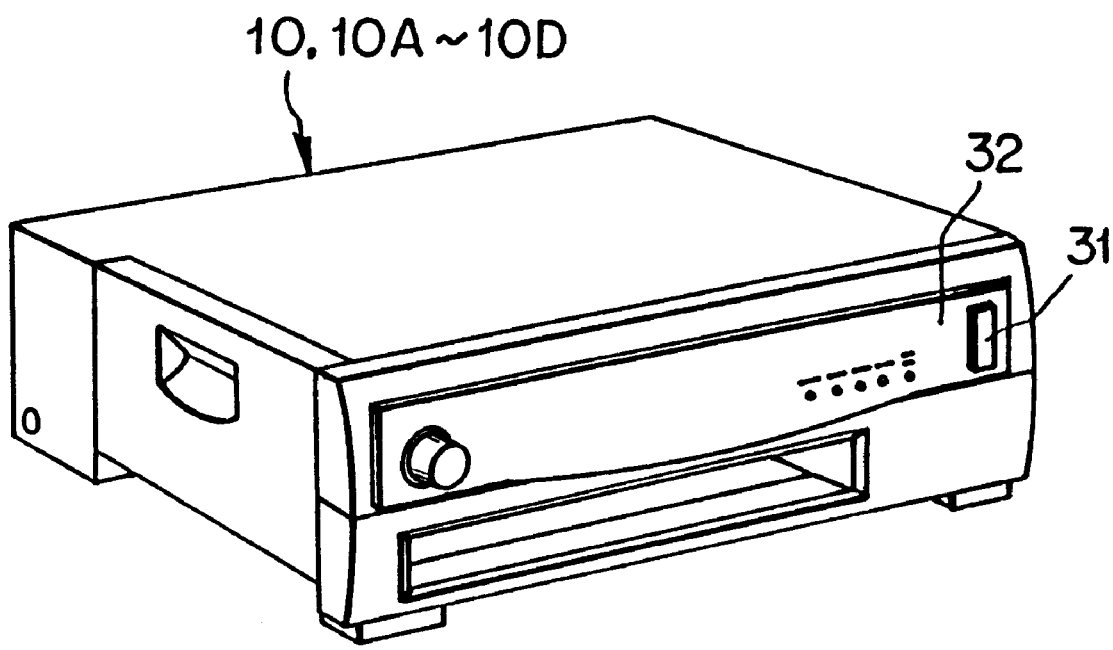
FIGS. 2, 4 and 5 are schematic perspective views of an image reading apparatus according to a first embodiment of this invention.
Figure 3:
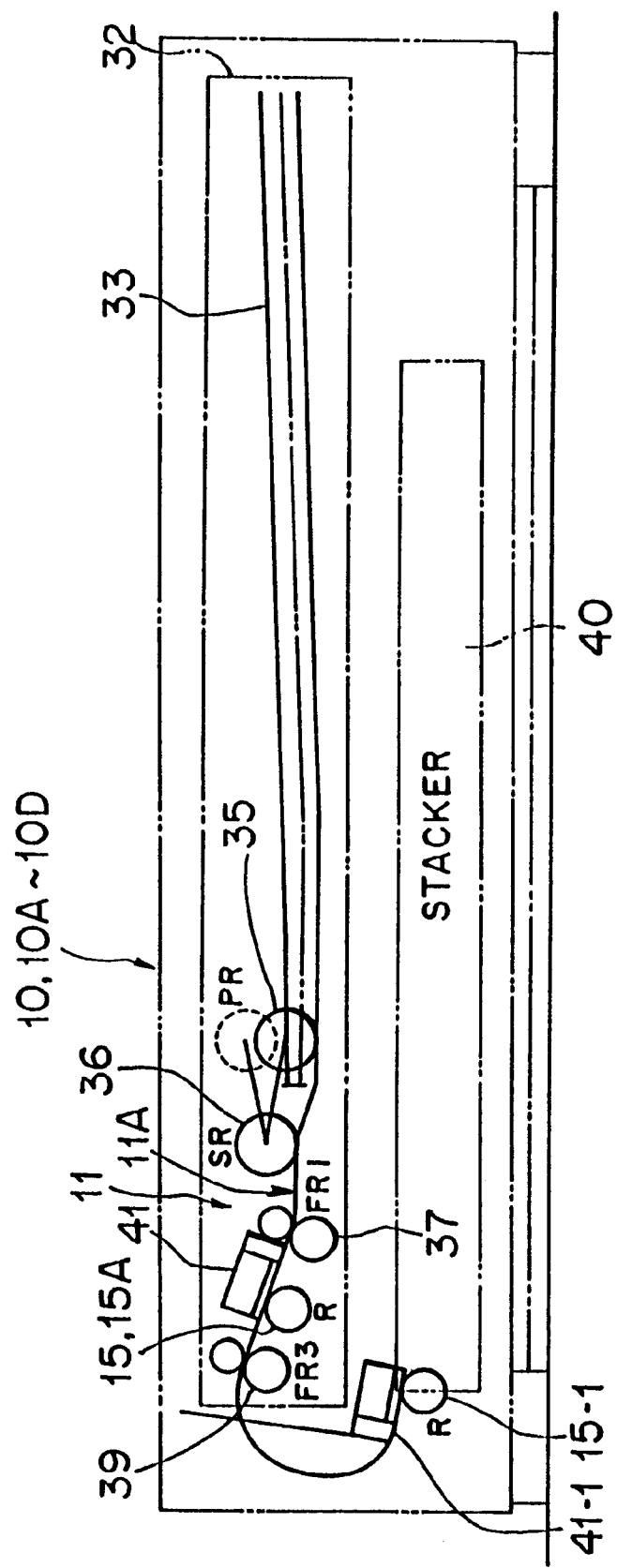
FIG. 3 is a schematic vertical sectional view of the image reading apparatus according to the first embodiment of this invention.
Figure 4:
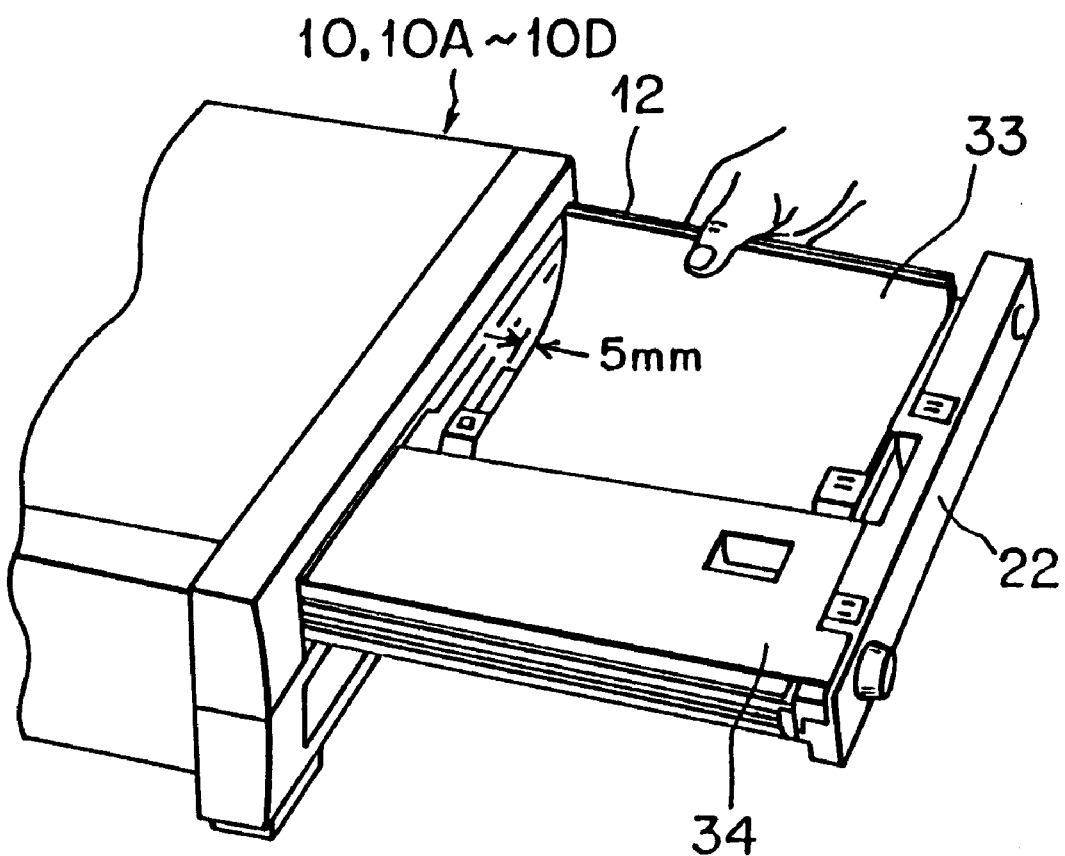
Figure 5:
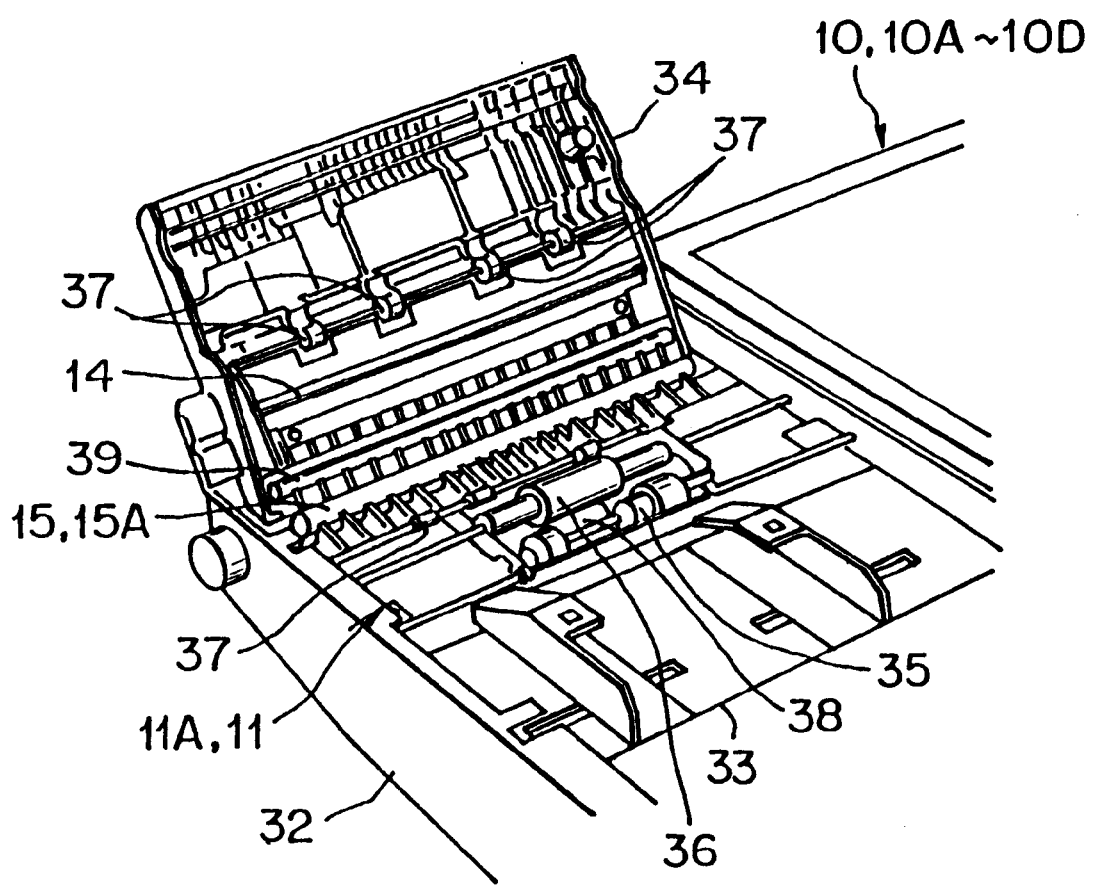
Figure 6:
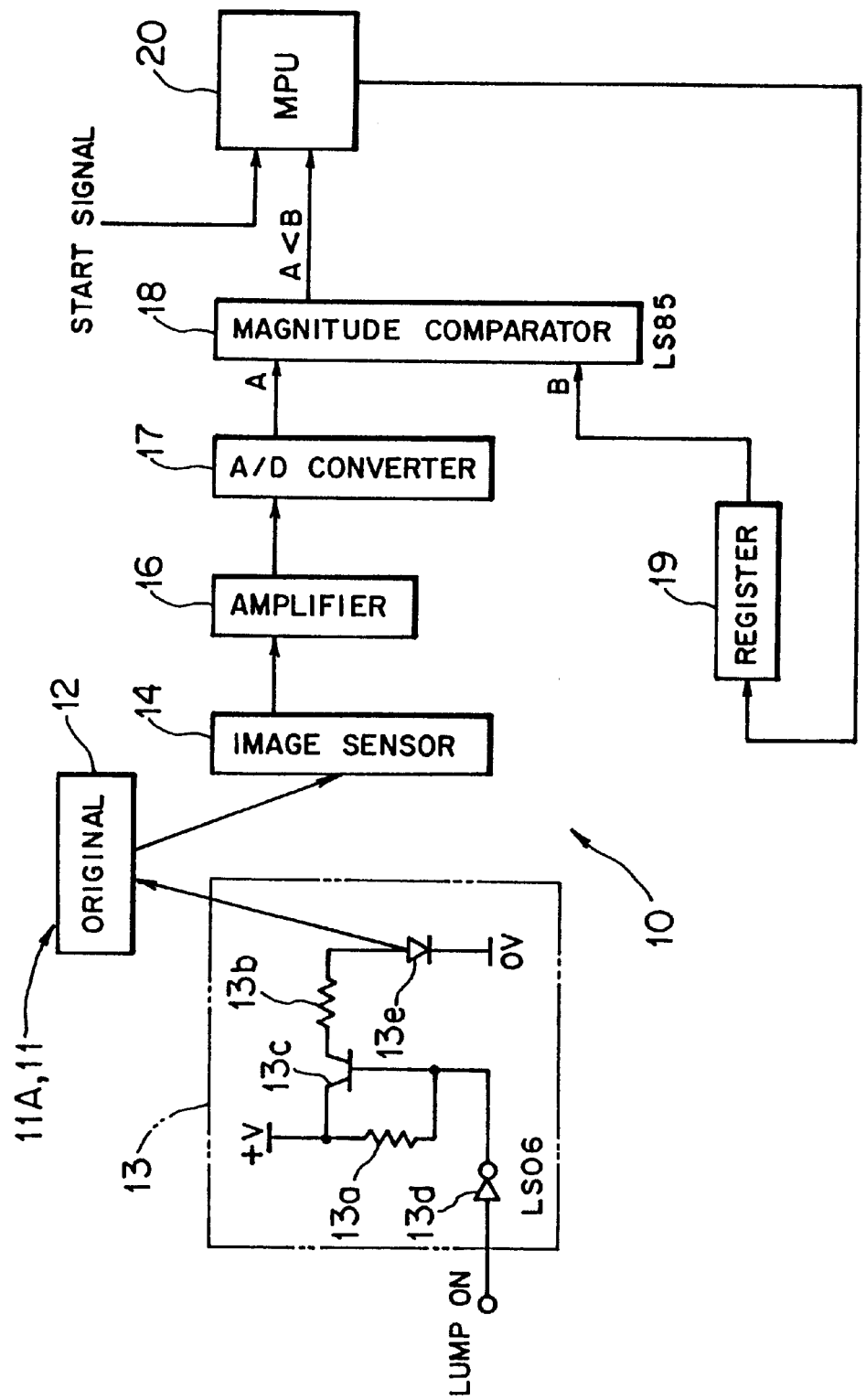
FIG. 6 is a block diagram of an essential part of the image reading apparatus according to the first embodiment of this invention.

FIGS. 2, 4 and 5 are schematic perspective views of an image reading apparatus according to this embodiment. FIG. 3 is a schematic vertical sectional view of the image reading apparatus according to this embodiment. FIG. 6 is a block diagram showing an essential part of the image reading apparatus according to this embodiment.

In FIGS. 2 and 3, reference numeral 32 denotes a table. The table 32 slides outwardly by pressing an opening/closing switch 31 (not shown in FIG. 3) provided outside the image reading apparatus 10 and is drawn out as shown in FIG. 4. The table 32 has an original feeding unit 11 and a paper feeding hopper 33 in which an original 12 having image information (image information) thereon is set.

In FIG. 3, the original feeding unit 11 feeds the original 12 set in the paper feeding hopper 33 via a feeding route 11A. Along the feeding route 11A, pick rollers 35 (PR; Pick Rollers), a separation roller (SR; Separation Roller) 36, feed rollers (FR1, FR3; Feed Rollers) 37 and 39, an image detecting units 41 and 41-1 and feed rollers (FR2; Feed Rollers) 15 and 15-1 as the original-back supporting unit are disposed.

The image detecting unit 41 is disposed on the feeding route 11A of the original feeding unit 11, which is served to detect an image on the surface of the original 12 on the feeding route 11A. In detail, the image detecting unit 41 has an illuminating unit 13 as the light radiating unit for radiating lights on the original 12 fed by the original feeding unit 11, and an image sensor 14 for detecting an image on the original 12 on the basis of reflected lights from the original 12 as shown in FIG. 6 which will be described later.

The image detecting unit 41-1 is, as well, disposed on the feeding route 11A of the original feeding unit 11, which is served to detect an image on the back of the original 12 on the feeding route 11A. In detail, the image detecting unit 41-1 has an illuminating unit 13 for radiating lights on the original 12 fed by the original feeding unit 11, and an image sensor 14 for detecting an image on the original 12 on the basis of reflected lights from the original 12, similarly to the image detecting unit 41 mentioned above.

The above-mentioned illuminating unit 13 is appropriately controlled to be turned-on/off according to a control mode of the apparatus.

The pick roller 35 draws out the original 12 one by one set in the paper feeding hopper 33. For instance, the pick roller 35 descends such as to abut on the original 12, and rotates to draw out one sheet of the original 12. After that, the pick roller 35 ascends such as to depart from the original 12 (refer to dot line in FIG. 3). By repeating this operation, the original 12 is drawn out one by one.

The separation roller 36 draws only one sheet of the original 12 which has been drawn out from the pick roller 35 and feeds it to the feed roller 37 in the latter stage, which is formed with, for example, a friction pad.

The feed roller 37 generates a conveying force more than a reaction force of a load of the friction pad forming the separation roller 36 to secure a feeding accuracy from a read start sensor (not shown).

The feed roller 15 as the original-back supporting unit is a white-colored roller for securing a feeding accuracy of the original 12 passing through the image detecting unit 41. The feed roller 15 is disposed in a position across the feeding route which can reflect lights from the illuminating unit 13 in a direction toward the image sensor 14 of the image detecting unit 41.

The feed roller 39 is a final roller of the table 32, which discharges the original 12 which has been fed to the outside if the table 32 slides outwardly and is drawn out as shown in FIG. 4.

The feed roller 15-1 as the original-back supporting unit is disposed in a position on the back side of the original 12 on the feeding route 11A in relation to the image detecting unit 41-1 on which the lights from the illuminating unit 13 are radiated, which is a white-colored roller for securing a feeding accuracy of the original 12 passing through the image detecting unit 41-1. When the original 12 gets out of the region on which the lights are radiated from the illuminating unit 13, the lights are reflected by the feed roller 15-1, then the reflected lights come into the image sensor 14.

If the table 32 is housed inside the image reading apparatus 10 as shown in FIG. 2, the feed roller 15-1 has a function as a final roller by which the original 12 fed from the feed roller 39 is discharged to a stacker 40 in the latter stage.

The original feeding unit 11 constituting the table 32 has a lid unit 34 for covering the feeding route 11A as shown in FIG. 4. The lid unit 34 rotates around a shaft not shown extending in a direction in which the table 32 slides, and is manually opened by the operator, as shown in FIG. 5.

Particularly, the operator can maintain and check parts on the feeding route 11A by opening the lid unit 34. For instance, if a paper jam (a so-called jam) or the like occurs on the feeding route 11A, the operator manually opens the lid unit 34 to remove a jamming original on the feeding route 11A.

In FIG. 5, reference numeral 38 denotes a Pad ASY.

FIG. 6 is depicted paying attention to a mode of image reading and a mode of detecting open/close of the lid unit 34 in the image reading apparatus 10 according to this embodiment.

In FIG. 6, the illuminating unit 13 has a function as the light radiating unit for radiating lights on the original fed by the original feeding unit 11, which is configured with resistors 13a and 13b, a transistor 13c, an open collector gate 13d and an illuminating LED 13e.

The image sensor 14 is disposed on the feeding route 11A of the original feeding unit 11, which is served to detect an image of the original on the basis of reflected lights from the original 12. The detected image information (a video signal) is outputted as an analog electric signal.

Reference numeral 16 denotes an amplifier for amplifying the image detected information from the image sensor 14. Reference numeral 17 denotes an A/D converting unit for converting the analog electric signal as the detected image information amplified by the amplifier 16 into a digital signal.

Reference numeral 18 denotes a magnitude comparator. The magnitude comparator 18 compares a level of the detected image information of the digital signal from the A/D converting unit 17 with a slice level (B) of the digital signal from a register 19 described later in order to convert the detected image information from the image sensor 14 into binary information, and outputs a result of the comparison as binary information to an MPU 20.

Accordingly, the magnitude comparator 18 has a function as the comparing means for comparing the slice level set by the register 19 with the detected image information from the image sensor 14. The register 19 has a function as the slice level setting means for setting the slice level in advance by the MPU 20.

Namely, the above-mentioned magnitude comparator 18 and register 19 constitute the binary information converting unit for converting the detected image information from the image sensor 14 into the binary information.

The MPU 20 collectively controls a whole of the image reading apparatus 10, which sets the slice level of the above-mentioned register 19. In addition, the MPU 20 has a function as the data processing unit using the binary information from the magnitude comparator 18 as read image information on the occasion of image reading, or using it as information used to detect an open/close state of the original feeding unit 11 on the occasion excepting the image reading.

In other words, the MPU 20 generates the read image information on the basis of the binary information from the magnitude comparator 18 on the occasion of image reading, besides using the binary information as information used to detect an open/close state of the original feeding unit 11 on the occasion excepting the image reading.

Concretely, when the operator pushes down a start button not shown used to implement an image reading to initiate an image reading operation, a flag is set in the MPU 20 until this image reading operation is completed so that the MPU 20 can recognize that the apparatus is in an image reading operation.

The MPU 20 performs a data processing on the binary information from the magnitude comparator 18 as the read image information while the flag representing that the apparatus is in an image reading operation is raised. On the other hand, the MPU 20 performs a data processing on the binary information as information used to detect an open/close state of the original feeding unit 11 while the flag is not raised.

Namely, if the original feeding unit 11 is opened, a visual field of the image sensor 14 of the image detecting unit 41 gets out of the feed roller 15 (15-1) as the original-back supporting unit so that the image sensor 14 receives no reflected light. The image sensor 14 thereby obtains detected information similar to detected information of "black" data. The MPU 20 can recognize that the original feeding unit 11 is opened if the detected information of the "black" data is inputted from the magnitude comparator 18 on the occasion excepting image reading.

Figure 7:
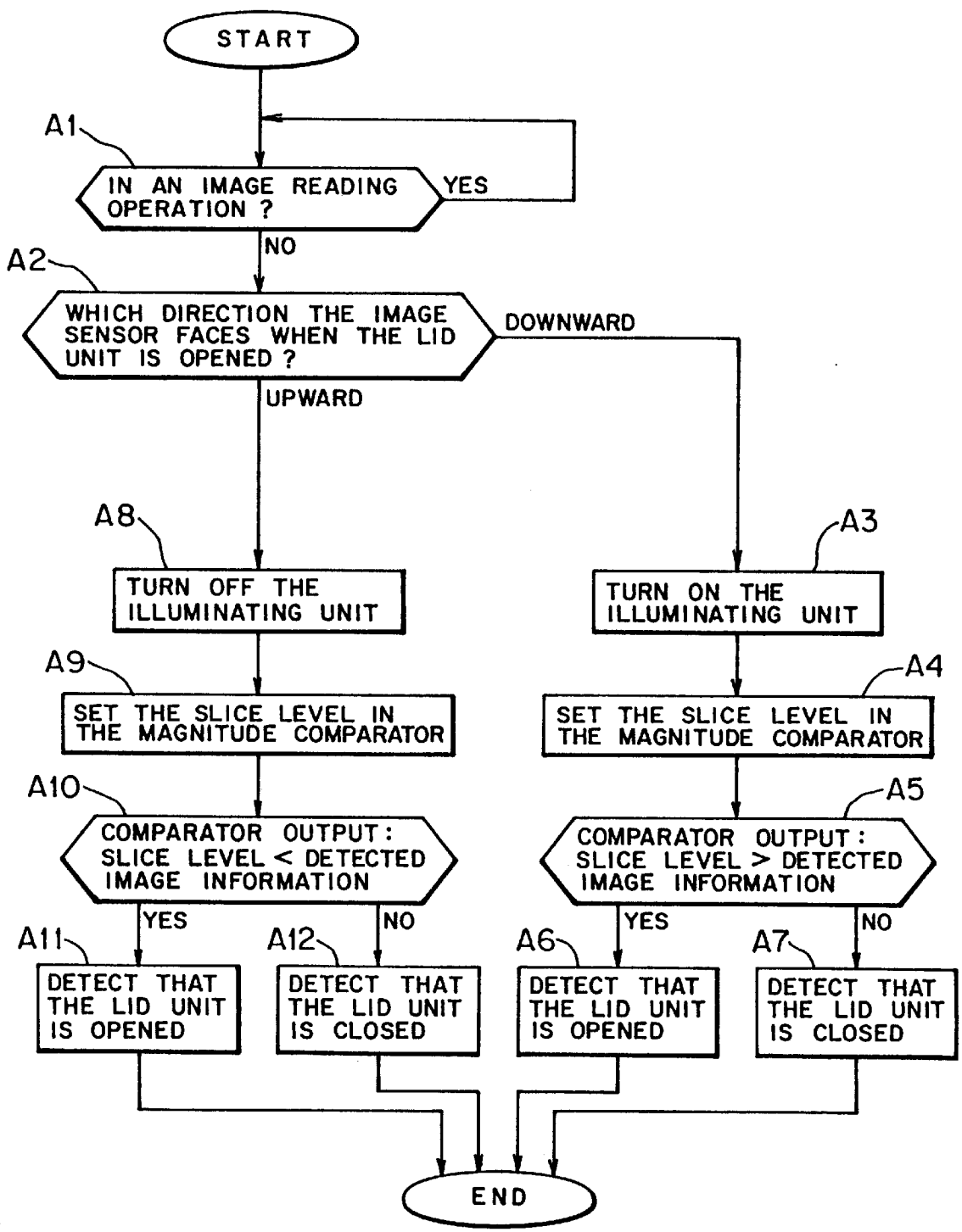
FIG. 7 is a flowchart for illustrating an operation of the image reading apparatus according to the first embodiment of this invention.

Next description will be of an operation of the image reading apparatus 10 with the above structure according to the first embodiment of this invention with reference to a flowchart shown in FIG. 7.

When the operator pushes down the start button not shown used to implement an image reading to initiate an image reading, a flag representing that the apparatus is in an image reading operation is raised in the MPU 20 until this image reading operation is completed. During which, no open/close detecting operation on the lid unit 34 is implemented (a YES route at Step A1).

If an image reading operation is implemented in the image reading apparatus 10, the original feeding unit 11 feeds the original 12 set in the paper feeding hopper 33 one by one. The image sensor 14 receives reflected lights of lights radiated by the illuminating unit 13 on the original 12 now being fed and outputs an analog signal as the detected image information on the basis of an intensity of the reflected incident lights.

Following that, the analog signal as the detected image information from the image sensor 14 is amplified by the amplifier 16, converted into a digital signal by the A/D converting unit 17, further converted into binary information by the magnitude comparator 18.

Namely, the magnitude comparator 18 compares a level (A) of the detected image information of the digital signal from the A/D converting unit 17 with the slice level (B) set by the register 19. If the detected image information is larger than the slice level, the magnitude comparator 18 detects that an image in a position on the original 12 from which lights radiated by the illuminating unit 13 come into is "white", and outputs a white signal as the binary information.

If the image detected information is smaller than the slice level, an image in a position on the original 12 from which lights radiated by the illuminating unit 13 come into is "black", the magnitude comparator 18 thus outputs a black signal as the binary information.

As above, the MPU 20 can generate and recognize the read image information of the original 12 by being inputted the binary information of an entire surface of the original 12 from the magnitude comparator 18.

After that, when the image reading operation is completed, a flag representing that the apparatus is in an image reading operation is reset in the MPU 20 so that an open/close detecting operation on the lid unit 34, that is, the original feeding unit 11, is implemented as follows (a NO route at Step A1).

If the image sensor 14 is such disposed as to face downward when the lid unit 34 of the original feeding unit 11 is opened as the image sensor 14, for example, as shown in FIG. 5, open/close of the lid unit 34 is detected on the basis of the binary information from the magnitude comparator 18 while the illuminating unit 13 is turned on.

Namely, the MPU 20 controls the illuminating unit 13 to be turned on (Step A3), besides setting the slice level in the register 19 (Step A4). The magnitude comparator 18 compares the detected image information of a digital signal from the A/D converting unit 17 with the slice level from the register 19 (Step A5), and outputs a result of the comparison as detected open/close information (binary information) of the lid unit 34.

Concretely, the magnitude comparator 18 outputs detected information representing that the lid unit 34 constituting the original feeding unit 11 is in the open state as the binary information if the detected image information of an entire surface of the original 12 from the A/D converting unit 17 is smaller than the slice level from the register 19 (from a YES route at Step A5 to Step A6), or outputs detected information representing that the lid unit 34 is in the close state as the binary information if the detected image information is above the slice level (a YES route at Step A5 to Step A7).

In other words, if the lid unit 34 is closed, the original-back supporting unit 15 can be seen from the image sensor 14 so that the signal must be a white signal as a binary signal (the detected image information≧the slice level). If the lid unit 34 is opened, no reflected light comes into the image sensor 14 so that the signal must be a black signal as the binary signal (the detected image information<the slice level).

In the MPU 20, if a white signal is inputted as the binary signal from the magnitude comparator 18, this binary signal is used as a detected signal representing that the original feeding unit 11 is in the close state. If a black signal is inputted, this binary signal is used as a detected signal representing that the original feeding unit 11 is in the open state.

Meanwhile, if the image sensor 14 is such disposed as to face upward if the lid unit 34 of the original feeding unit 11 is opened as the image sensor 14 shown in, for example, FIG. 5, open/close of the lid unit 34 is detected on the basis of the binary information from the magnitude comparator 18 obtained while the illuminating unit 13 is turned off.

Namely, the MPU 20 controls the illuminating unit 13 to be turned off (Step A8), besides setting the slice level in the register 19 (Step A9). The magnitude comparator 18 compares the detected image information of a digital signal from the A/D converting unit 17 with the slice level from the register 19 (Step A10), then outputs a result of the comparison as detected open/close information (the binary information) of the lid unit 34.

Concretely, the magnitude comparator 18 outputs detected information representing that the lid unit 34 is in the open state as the binary information if the detected image information of an entire surface of the original 12 from the A/D converting unit 17 is equal to or larger than the slice level (from a YES route at Step A10 to Step A11). If the detected image information is below the slice level from the register 19, the magnitude comparator 18 outputs detected information representing that the lid unit 34 constituting the original feeding unit 11 is in the close state as the binary information (from a NO route at Step A10 to Step A12).

In other words, the original-back supporting unit 15 cannot be seen from the image sensor 14 if the lid unit 34 is closed since the illuminating unit 13 is turned off so that a black signal (the detected image information<the slice level) is outputted as the binary signal. If the lid unit 34 is opened, a white signal (the detected image information≧the slice level) is outputted as the binary signal since lights from the outside come into the image sensor 14.

In the MPU 20, this binary signal is used as a detected signal representing that the original feeding unit 11 is in the close state if a black signal is inputted as the binary signal from the magnitude comparator 18. If a white signal is inputted, this binary signal is used as a detected signal representing that the original feeding unit 11 is in the open state.

In the image reading apparatus 10 according to the first embodiment of this invention, the MPU 20 can use the binary information from the magnitude comparator 18 as read image information on the occasion of image reading, or use it as information used to detect the open/close state of the original feeding unit 11 on the occasion excepting the image reading. In consequence, it is possible to detect the open/close state of the original feeding unit 11 using only existing circuits for image processing without causing an increase of the number of parts of the apparatus, suppress an increase of unnecessary cost required to constitute the apparatus, easily accomplish a hardware structure of the apparatus.

In this embodiment described above, the image reading apparatus 10 has the image detecting unit 41-1 and the feed roller 15-1. However, it is possible to appropriately omit these parts. In which case, the advantages as stated above are, of course, available.

(c) Description of Second Embodiment

Figure 8:
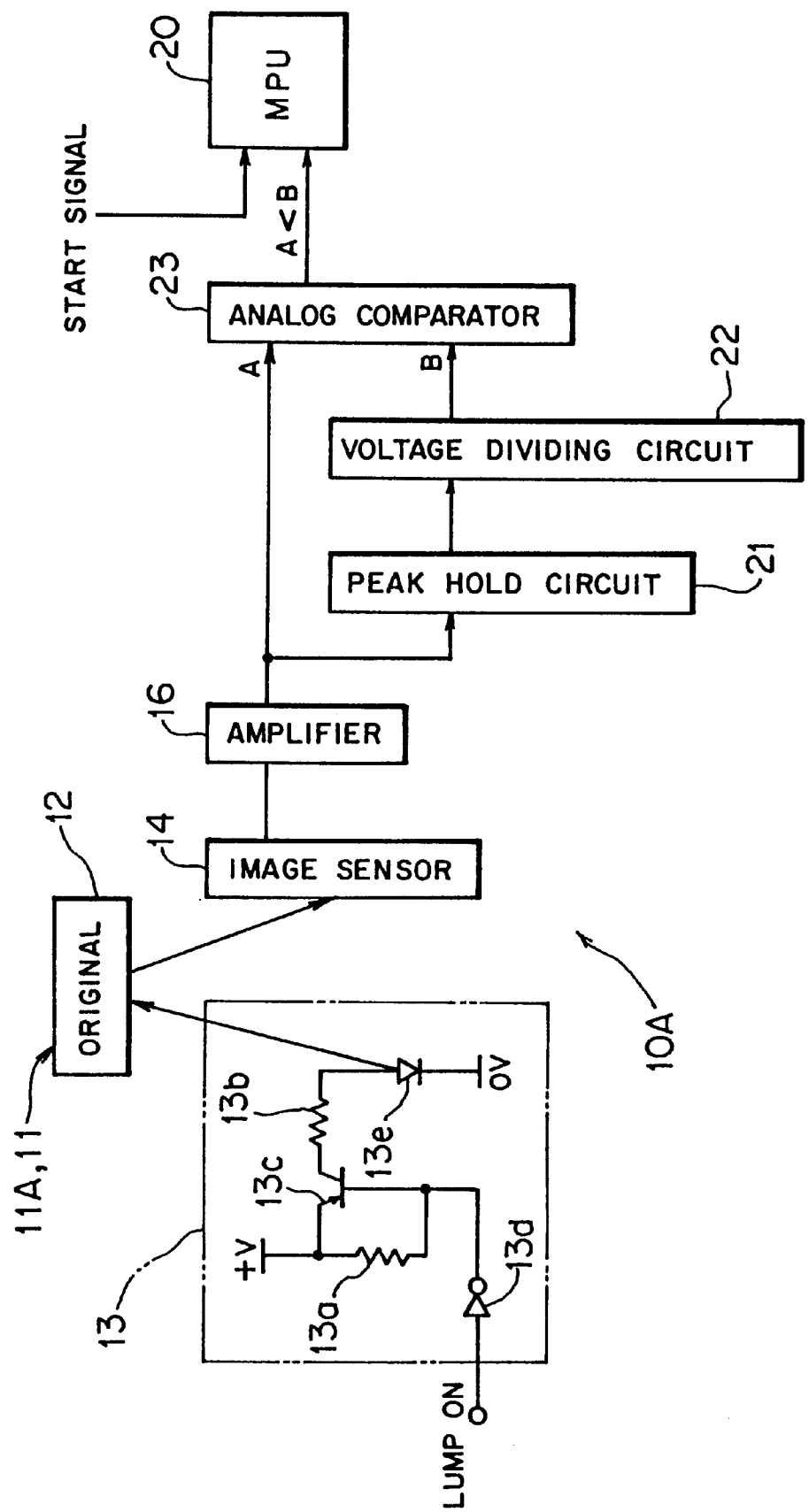
FIG. 8 is a block diagram of an essential part of an image reading apparatus according to a second embodiment of this invention.

FIG. 8 is a block diagram depicted paying an attention to a mode of image reading and a mode of detecting open/close of the lid unit in an image reading apparatus according to a second embodiment of this invention. The image reading apparatus 10A according to this embodiment has basically the same structure as the above-mentioned image reading apparatus according to the first embodiment except for a mode of image reading and a mode of detecting open/close of the lid unit 34.

More specifically, the image reading apparatus 10A according to this embodiment has a structure as having been described with reference to FIGS. 2 through 5. Incidentally, like reference characters in FIG. 8 designate like or corresponding parts in FIGS. 2 through 6.

Here, reference numeral 21 denotes a peak hold circuit. The peak hold circuit 21 has a function as the peak value holding means for holding a peak value of the detected information lastly inputted from the image sensor 14. Concretely, the peak hold circuit 21 holds a peak value of an analog signal at the time of reading the last image information.

Reference numeral 22 denotes a voltage dividing circuit. The voltage dividing circuit 22 has a function as the voltage dividing means for dividing a level held in the peak hold circuit 21. Concretely, the voltage dividing circuit 22 is configured with plural resistors, which divides a peak value of an analog signal from the peak hold circuit 21 and outputs it. A result of the voltage division is set as the slice level.

Reference numeral 23 denotes an analog comparator. The analog comparator 23 compares an analog signal level as the detected image information from the amplifier 16 with an analog signal level as the slice level from the voltage dividing circuit 22, and outputs a result of the comparison as the binary information to the MPU 20.

Accordingly, the analog comparator 23 has a function as the comparing means for comparing the slice level set by the voltage dividing circuit 22 with the detected image information from the image sensor 14, besides having a function as the slice level setting means (that is, the binary information converting unit) for setting the slice level with the peak hold circuit 21 and the voltage dividing circuit 22.

Figure 9:
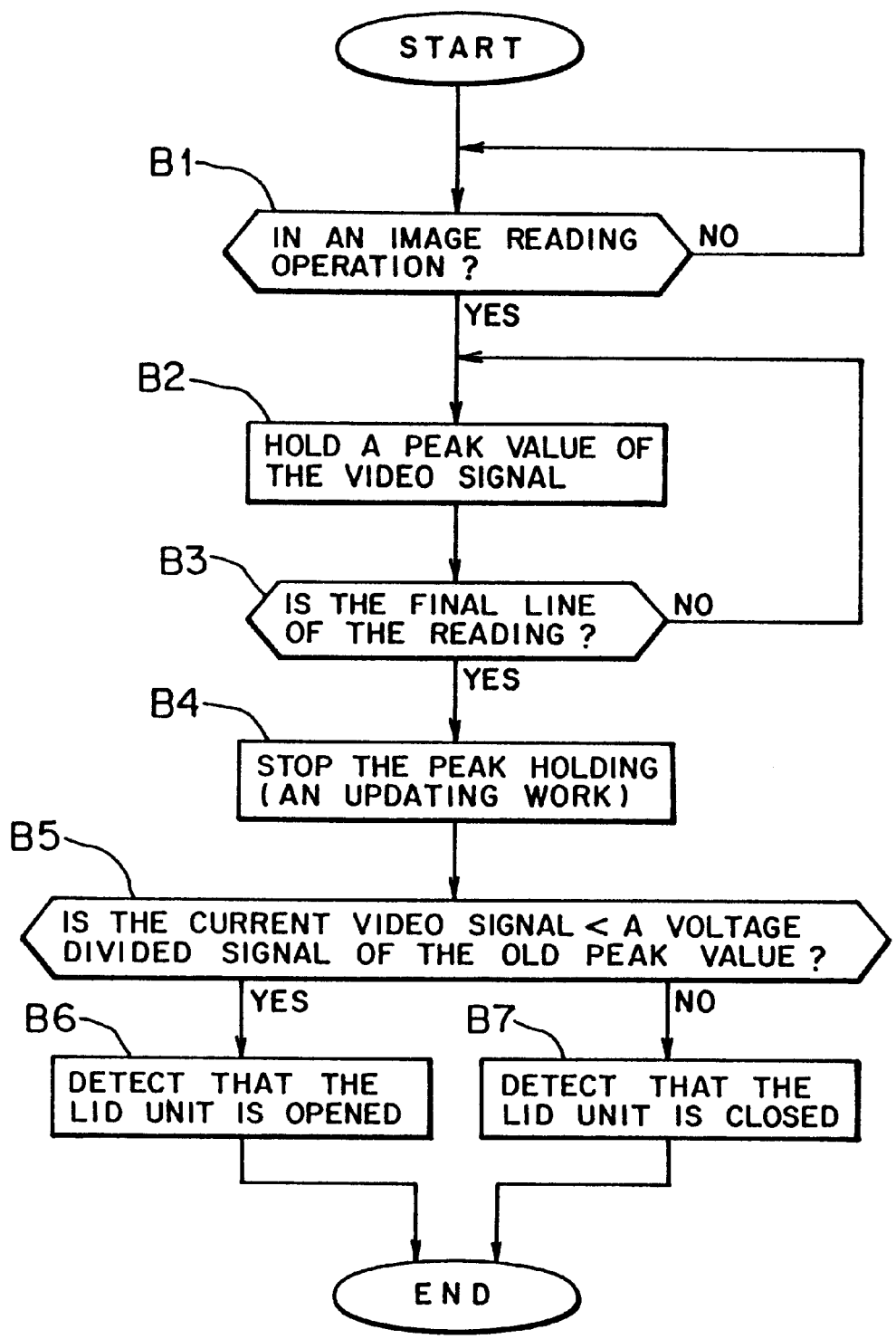
FIG. 9 is a flowchart for illustrating an operation of the image reading apparatus according to the second embodiment of this invention.

An operation of the image reading apparatus 10A with the above structure according to the second embodiment of this invention will be next described with reference to a flow-chart shown in FIG. 9.

The operator pushes down the start button not shown used to implement an image reading so as to initiate an image reading operation using the detected image information from the image sensor 14.

Concretely, the analog comparator 23 is inputted thereto a voltage divided signal of a peak value of the detected image information lastly inputted from the voltage dividing circuit 22 and the detected image information (image information of the original 12 now being fed) detected by the image sensor 14 from the amplifier 16 to compare levels of these information, and outputs the binary information as the read image information.

When this image reading operation is initiated, a flag representing that the apparatus is in an image reading operation is raised in the MPU 20 until this image reading operation is completed so that the binary information from the analog comparator 23 is used as the read image information.

For instance, if the detected image information of the original 12 now being fed is smaller than or below the voltage divided signal from the voltage dividing circuit 22, a binary signal representing that an image in a position on the original 12 from which lights radiated by the illuminating unit 13 come into is "black" is outputted. If the currently detected image information is above or larger than the voltage divided signal from the voltage dividing circuit 22, a binary signal representing "white" is outputted.

Further, the open/close detecting operation on the lid unit 34 is not implemented while the flag representing that the apparatus is in an image reading operation is raised in the MPU 20, but a process of updating a peak value held in the peak hold circuit 21 is performed (a YES route at Step B1).

Namely, the analog signal as the detected image information of the original 12 from the image sensor 14 is amplified by the amplifier 16, then outputted as the amplified detected image information (a video signal) to the analog comparator 23 and the peak hold circuit 21.

The peak hold circuit 21 holds a peak value of the analog signal obtained when the last image information is read on the basis of the video signal from the image sensor 14. The voltage dividing circuit 22 divides a level held in the peak hold circuit 21, and outputs it to the analog comparator 23 (Step B2).

The analog comparator 23 compares a level (A) of the detected image information of the analog signal from the amplifier 16 with a voltage divided signal (B) from the voltage dividing circuit 22. If the detected image information is larger than the voltage divided signal, the analog comparator 23 detects an image in a position on the original 12 from which lights radiated by the illuminating unit 13 come into as "white", and output a white signal as the binary information.

If the detected image information is smaller than the voltage divided signal, the analog comparator 23 detects that an image in a position on the original 12 from which lights radiated by the illuminating unit 13 come into is "black", thus outputs a black signal as the binary information.

As above, the MPU 20 can recognize the binary information as the read image information of the original 12 by being inputted the binary information of the entire surface of the original 12 from the analog comparator 23.

After that, when the reading reaches the final line of the original 12 and the image reading operation is terminated (a YES route at Step B3), the operation of updating the peak value in the peak hold circuit 21 is stopped (Step B4), besides a flag representing that the apparatus is in the reading operation is reset in the MPU 20, then the operation of detecting open/close of the lid unit 34, that is, the original feeding unit 11, is implemented as follows (Step B5).

The analog comparator 23 compares a level (A) of the analog signal as the current detected image information from the amplifier 16 with a voltage divided signal (B) of the peak hold value updated at the time of the image reading operation in the preceding stage from the voltage dividing circuit 22. If the detected image information is smaller than the voltage divided signal, the lid unit 34, that is, the original feeding unit 11, is in the open state, thus a binary signal representing that is outputted to the MPU 20 (a YES route at Step B5 to Step B6).

If the level of the detected image information is above the voltage divided signal, the lid unit 34, that is, the original feeding unit 11, is in the close state, thus a binary signal representing that is outputted to the MPU 20 (a NO route at Step B5 to Step B7).

As above, the image reading apparatus 10A according to the second embodiment of this invention has the peak hold circuit 21 and the voltage dividing circuit 22, in which an output from the voltage dividing circuit 22 is set as the slice level used to implement comparison in the analog comparator 23, whereby the binary information from the analog comparator 23 can be used as the read image information on the occasion of image reading. On the occasion excepting the image reading, the binary information from the analog comparator 23 can be used as information used to detect the open/close state of the original feeding unit 11. It is therefore possible to detect the open/close state of the original feeding unit 11 using only existing circuits for image processing without causing an increase of the number of parts of the apparatus, similarly to the example according to the above-mentioned first embodiment. It is further possible to suppress an increase of unnecessary cost required to constitute the apparatus, and easily accomplish a hardware structure of the apparatus.

In the embodiment described above, the image reading apparatus 10A has the analog comparator 23 which compares the slice level signal as an analog signal with detected image information level. However, the present invention is not limited to the above example, but a slice level signal as a digital signal may be compared with a detected image information level to detect open/close of the original feeding unit 11 on the basis of a result of the comparison, for example. In which case, it is also possible to attain the same advantages as this embodiment described above.

Figure 10:
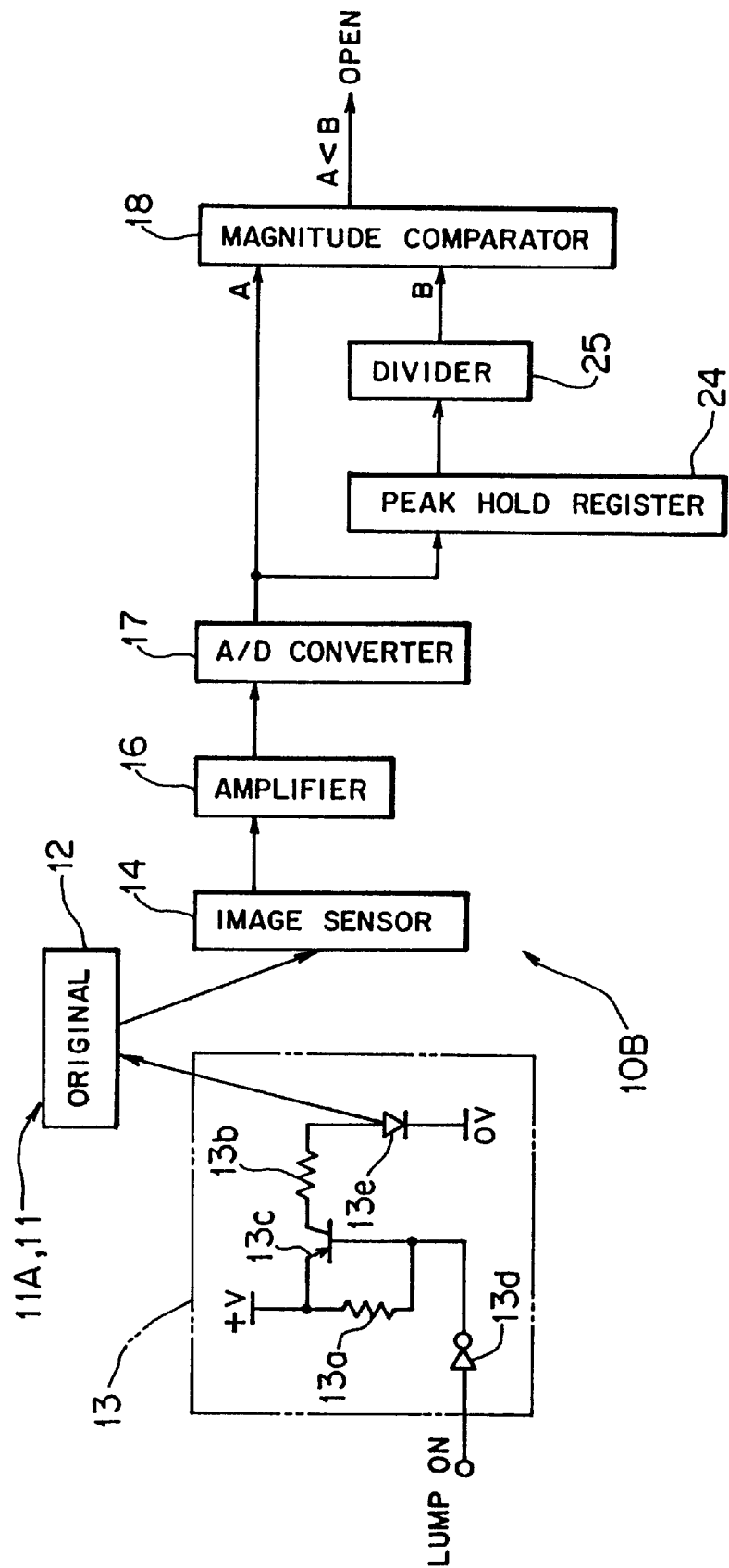
FIG. 10 is a block diagram of an essential part of a modification of the image reading apparatus according to the second embodiment of this invention.

In such case, the image reading apparatus 10A is provided with the A/D converting unit 17 in the latter stage of the amplifier 16, which converts an analog signal into a digital signal, similarly to the image reading apparatus 10B shown in FIG. 10, for example. In addition, there are also provided a peak hold register 24, a divider 25 and a magnitude comparator 18 similar to that having been described in the first embodiment instead of the peak hold circuit 21, the voltage dividing circuit 22 and the analog comparator 23.

More specifically, the peak hold register 24 as the peak value holding means holds a peak value as a digital signal from the A/D converting unit 17. The divider 25 as the voltage dividing means outputs bit information obtained by implementing a process such as to discard, for example, a high order bit information (1 bit, for example) as the slice level to the magnitude comparator 18.

The magnitude comparator 18 thereby compares the detected image information of a digital signal from the A/D converting unit 17 with the slice level of a digital signal from the divider 25 on the occasion excepting image reading. The MPU 20 can use a binary signal as a result of the comparison from the magnitude comparator 18 as open/close information of the original feeding unit 11.

(d) Description of Third Embodiment

Figure 11:
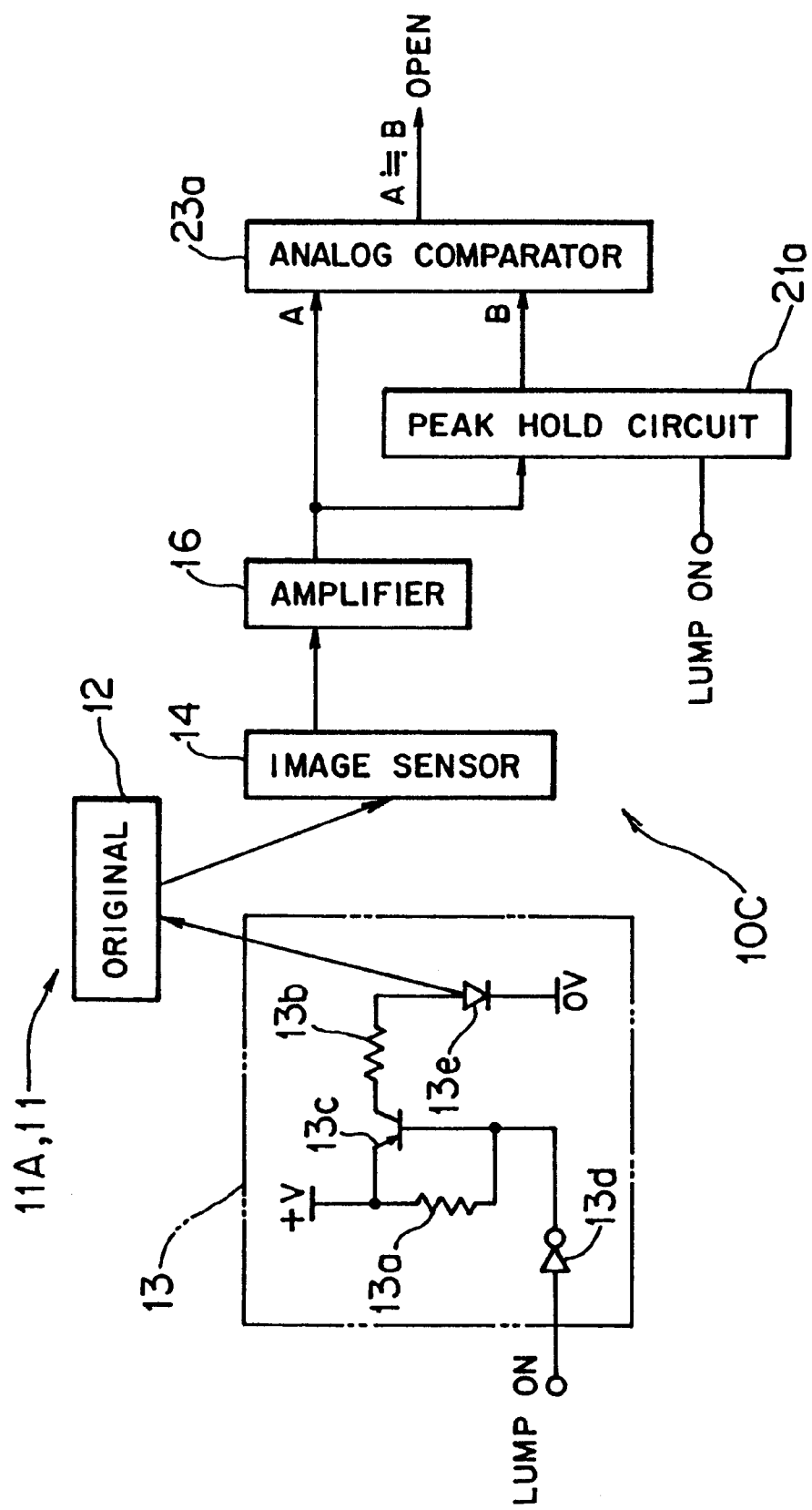
FIG. 11 is a block diagram of an essential part of an image reading apparatus according to a third embodiment of this invention.

FIG. 11 is a block diagram depicted paying an attention to a mode of image reading and a mode of detecting open/close of the lid unit in an image reading apparatus according to a third embodiment of this invention. The image reading apparatus 10C according to this embodiment has a mode of image reading and a mode of detecting open/close of the lid unit different from those according to the first and second embodiments described hereinbefore. Another structure of the image reading apparatus 10C is basically the same.

Namely, the image reading apparatus 10C according to this embodiment has a structure as having been hereinbefore described with reference to FIGS. 2 through 6. Incidentally, like reference characters in FIG. 11 designate like or corresponding parts in FIGS. 2 through 6.

Here, reference numeral 21a denotes a peak hold circuit. The peak hold circuit 21a has a function as the light radiating time peak value holding means for holding a peak value of detected information from the image sensor 14 obtained while the illuminating unit 13 radiates lights (while the illuminating unit 13 is in a turned-on state), besides holding a peak value of detected image information from the image sensor 14 obtained while the illuminating unit 13 does not radiate lights.

The peak hold circuit 21a is inputted thereto bit information (for example, bit information becoming '1' in a turned-on state, and '0' in a turned-off state) as a LUMPON signal representing a turned-on/turned-off state of the illuminating unit 13 so as to hold a peak value in the turned-on/turned-off state of the illuminating unit 13.

Reference numeral 23a denotes an analog comparator. The analog comparator 23a has a function as the peak value comparing means for comparing peak value information held in the peak hold circuit 21a with detected information from the image sensor 14 obtained while the illuminating unit 13 does not radiate lights. A result of the comparison by the analog comparator 23a is outputted as binary information.

Concretely, the analog comparator 23a compares peak value information (B) obtained while the illuminating unit 13 radiates lights with a peak value (A) of the detected information from the image sensor 14 obtained while the illuminating unit 13 does not radiate lights.

If a difference between these peak value levels (A) and (B) is large (B>A), reflected lights from the feed roller 15 as the original-back supporting unit come into the image sensor 14 so that the analog comparator 23a outputs binary information representing that the original feeding unit 11 is in the close state.

If a difference between these peak value levels (A) and (B) is little, reflected lights do not come into the image sensor 14 even while the illuminating unit 13 radiates lights so that the analog comparator 23a outputs binary information representing that the original feeding unit 11 is in the open state.

Namely, the above-mentioned peak hold circuit 21a and analog comparator 23a constitute the binary information converting means for converting detected image information from the image sensor 14 into binary information.

Figure 12:
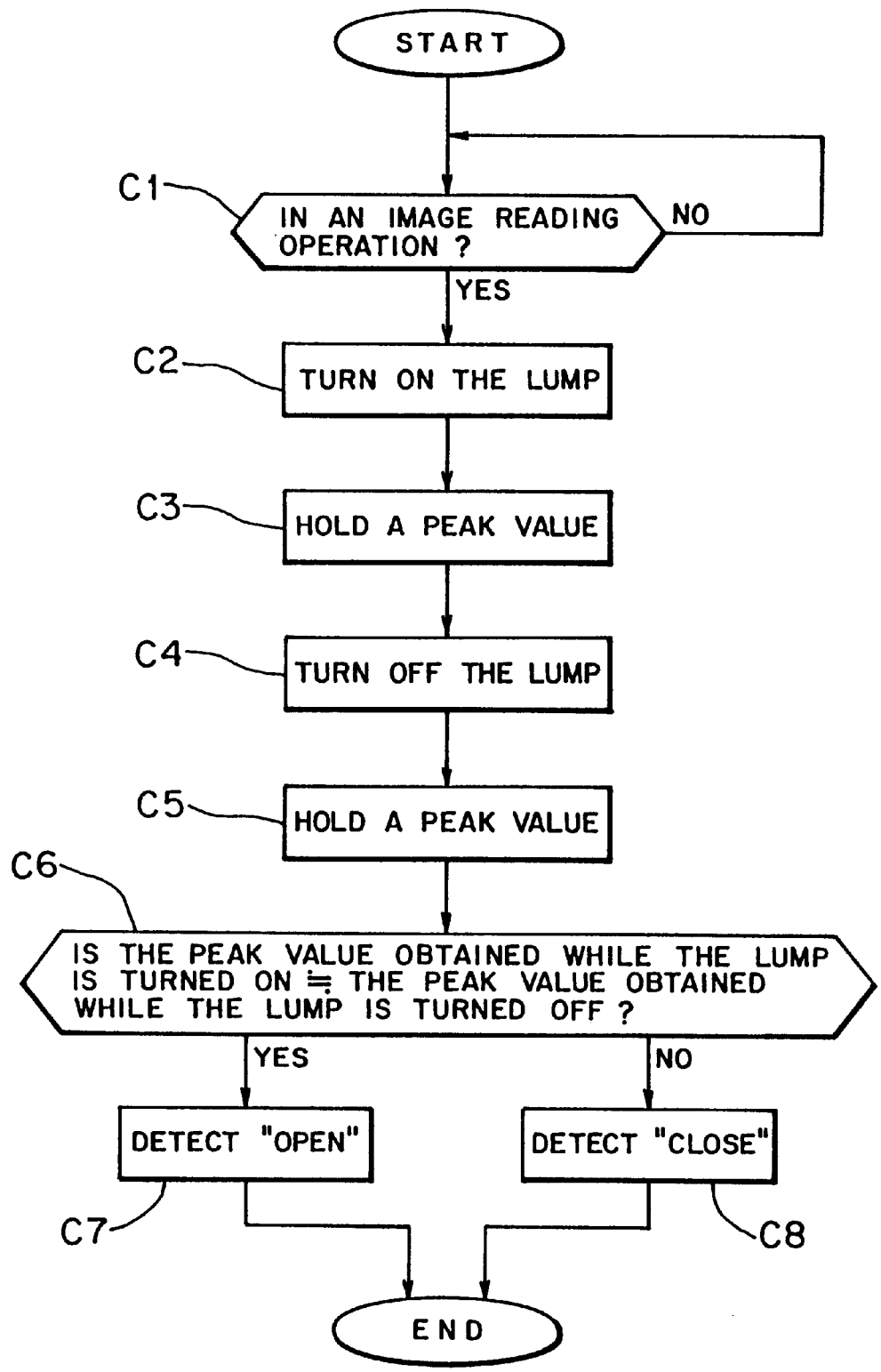
FIG. 12 is a flowchart for illustrating an operation of the image reading apparatus according to the third embodiment of this invention.

An operation of the image reading apparatus 10C with the above structure according to the third embodiment of this invention will be next described with reference to a flowchart shown in FIG. 12.

The operator pushes down the start button not shown used to implement an image reading so as to initiate an image reading operation using detected image information from the image sensor 14.

Concretely, the analog comparator 23a is inputted thereto a peak value of detected image information obtained in the last reading operation (image information of the original 12 fed last time while the illuminating unit 13 is turned on) from the peak hold circuit 21a and detected image information (image information of the original 12 now being fed) detected by the image sensor 14 from the amplifier 16 so as to compare levels of these information, and outputs binary information as read image information.

When this image reading operation is initiated, a flag representing that the apparatus is in an image reading operation is raised in the MPU 20 until this image reading operation is terminated so that the binary information from the analog comparator 23a is used as the read image information.

If a difference between the detected image information of the original 12 now being fed and a peak value from the peak hold circuit 21a is large (if the detected image information is smaller than the peak value), for example, a binary signal representing that an image in a position on the original 12 from which lights radiated by the illuminating unit 13 come into is "black" is outputted. If the detected image information is approximately equal to the peak value, a binary signal representing "white" is outputted.

When the image reading operation is initiated, a flag representing that the apparatus is in an image reading operation is raised in the MPU 20 until this image reading operation is terminated. During which, no operation of detecting open/close of the lid unit 34 is implemented, but an updating process on the peak value obtained while the illuminating unit 13 radiates lights (during the turned-on state, a LUMPON signal: '1') held in the peak hold circuit 21a is performed (Steps C2 and C3).

An analog signal as the detected image information of the original 12 from the image sensor 14 is amplified by the amplifier 16, then outputted as amplified detected image information (a video signal) to the peak hold circuit 21a.

The peak hold circuit 21a performs an updating process on the peak value obtained during the turned-on state until the image reading operation is terminated and the illuminating unit 13 becomes the turned-off state (a LUMPON signal: '0') (Step C4). After that, the peak hold circuit 21a holds a peak value obtained during the turned-off state, and outputs it along with the above peak value obtained during the turned-on state to the analog comparator 23a.

If a peak value obtained while the illuminating unit 13 is in the turned-on state is considerably larger than a peak value obtained while the illuminating unit 13 is in the turned-off state, the analog comparator 23a outputs a binary information representing that the original feeding unit 11 is in the close state since reflected lights from the feed roller 15 as the original-back supporting unit come into the image sensor 14.

If a peak value obtained while the illuminating unit 13 is in the turned-on state is approximately equal to a peak value obtained while the illuminating unit 13 is in the turned-off state, the analog comparator 23a outputs a binary information representing that the original feeding unit 11 is in the open state since reflected lights from the feed roller 15 do not come into the image sensor 14 even while the illuminating unit 13 radiates lights.

According to the third embodiment of this invention, the image reading apparatus 10C has the peak hold circuit 21a and the analog comparator 23a, in which a result of comparison by the analog comparator 23a is outputted as binary information. The binary information from the analog comparator 23a can be used as read image information on the occasion of image reading. On the occasion excepting the image reading, the binary information can be used as information used to detect the open/close state of the original feeding unit 11. It is therefore possible to detect the open/close state of the original feeding unit 11 using only existing circuits for image processing without causing an increase of the number of parts of the apparatus, suppress an increase of unnecessary cost required to constitute the apparatus, and easily accomplish a hardware structure of the apparatus similarly to the examples according to the first and second embodiments.

(e) Description of Fourth Embodiment

Figure 13:
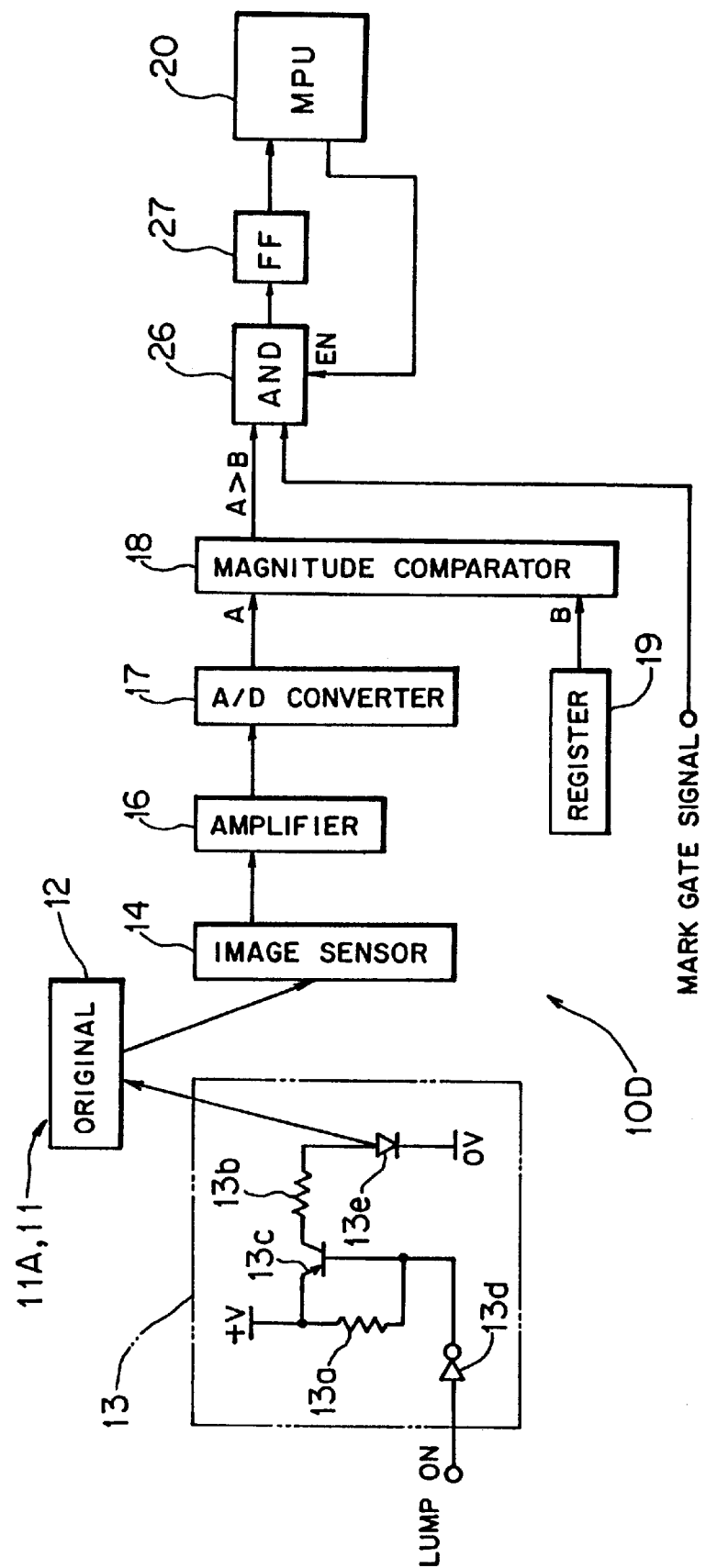
FIG. 13 is a block diagram of an essential part of an image reading apparatus according to a fourth embodiment of this invention.

FIG. 13 is a block diagram depicted paying an attention to a mode of image reading and a mode of detecting open/close of the lid unit in an image reading apparatus according to a fourth embodiment of this invention. The image reading apparatus 10D according to this embodiment has a mode of image reading similar to that having been described hereinbefore according to the first embodiment except for a structure of the feed roller 15A as the original-back supporting unit and a mode of detecting open/close of the lid unit 34. Another structure of the image reading apparatus 10D according to this embodiment is basically the same.

The image reading apparatus 10D according to this embodiment has a structure as having been described hereinbefore with reference to FIGS. 2 through 5. Incidentally, like reference characters in FIG. 13 designate like or corresponding parts in FIGS. 2 through 5.

The image reading apparatus 10D according to this embodiment has a feed roller 15A as the original-back supporting unit different from that described hereinbefore according to each of the embodiments (refer to reference numeral 15), an AND circuit 26 and a flip-flop 27.

The feed roller 15A has an outer peripheral region of a surface which can receive lights from the illuminating unit 13 formed with a member which can reflect the lights to the image sensor 14, and an inner region inside the outer peripheral region which is formed with a member which does not reflect lights to the image sensor 14.

More specifically, as the above-mentioned feed roller 15A, a black or mirror roller is, for example, used, and white-colored tape are pasted around on both sides of the roller at a spacing equal to a width of an original, thereby forming the outer peripheral region and the inside region mentioned above.

If lights radiated from the illuminating unit 13 come off a region of the original 12, the lights are reflected by the outer peripheral region of the feed roller 15A and the reflected lights come into the image sensor 14.

In a state where the original 12 is not fed if the original feeding unit 11 is closed (an image of the feed roller 15A is read), the magnitude comparator 18 detects the above-mentioned inner region of the outer peripheral region as "black" ($A \leq B$) while detecting the outer peripheral region as "white" ($A > B$).

The AND circuit 26 performs an AND operation on a binary signal from the magnitude comparator 18 and a mark gate signal set from the outside.

As the mark gate signal inputted to the AND circuit 26, there is used a digital signal such as to become an enable state on the basis of an enable signal EN from the MPU 20 only when the image reading apparatus 10D does not implement an image reading operation, become an 'H' level signal within a region in which an image of the outer peripheral region is detected, and become an 'L' level signal within the inner region of the outer peripheral region.

The AND circuit 26 can therefore output a signal representing that an image is "white" only if the image sensor 14 reads the outer peripheral region of the feed roller 15A in a state where the original 12 is not fed.

The flip-flop 27 outputs an 'H' level signal as a binary signal representing that the original feeding unit 11 is in the close state when a result of an arithmetic operation becomes an 'H' level signal from an 'L' level signal with the result of the arithmetic operation as timing information on the basis of the result of the arithmetic operation from the AND circuit 26.

More specifically, it can be known that reflected lights from the outer peripheral region of the feed roller 15A come into the image sensor 14 since a result of the arithmetic operation from the AND circuit 26 becomes an 'H' level signal from an 'L' level signal so that it is possible to detect that the original feeding unit 11 is in the close state from an output (the 'H' level signal) of the flip-flop 27.

If a result of the arithmetic operation from the AND circuit 26 remains to be an 'L' level signal, the flip-flop 27 outputs a binary signal (the 'L' level signal) representing that the original feeding unit 11 is in the open state since reflected lights from the outer peripheral region of the feed roller 15A do not come into the image sensor 14.

If the image reading apparatus 10D is in an image reading operation, the mark gate signal set from the outside is not in an enable state, but read image information outputted from the magnitude comparator 18 is outputted as it is to the MPU 20 via the AND circuit 26 and the flip-flop circuit 27.

The MPU 20 sets the slice level in the register 19 similarly to that according to the first embodiment described hereinbefore. The MPU 20 also has a function as the data processing unit using binary information from the flip-flop 27 as read image information on the occasion of image reading, or using an output signal from the flip-flop 27 as information used to detect the open/close state of the original feeding unit 11 on the occasion excepting the image reading by outputting an enable signal EN to the AND circuit 26.

The above-mentioned magnitude comparator 18, register 19, AND circuit 26 and flip-flop 27 accomplish a function as the binary information converting unit for converting detected image information from the image sensor into binary information.

Figure 14:
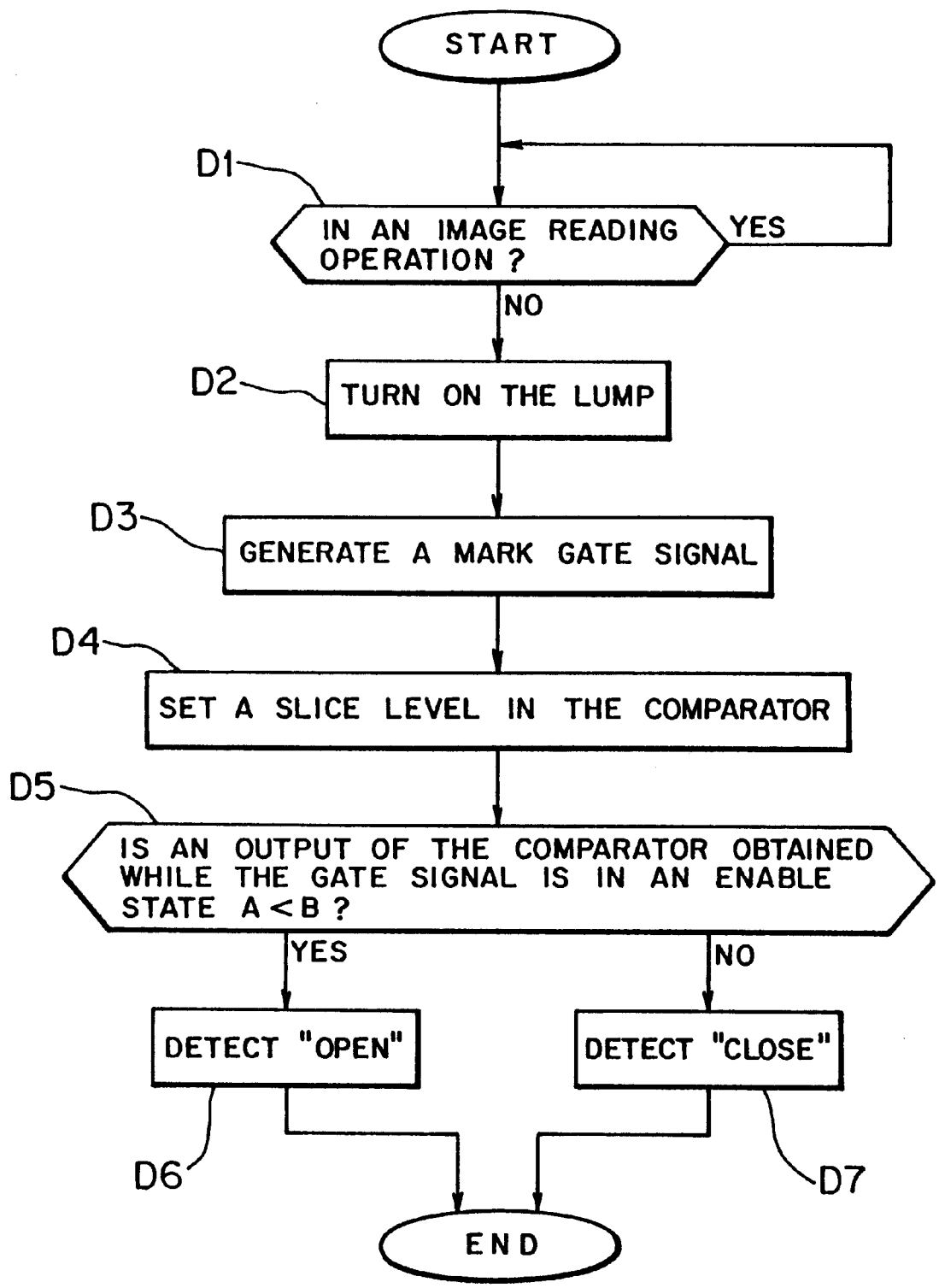
FIG. 14 is a flowchart for illustrating an operation of the image reading apparatus according to the fourth embodiment of this invention.

An operation of the image reading apparatus with above structure according to the fourth embodiment of this invention will be next described with reference to a flowchart shown in FIG. 14.

The operator pushes down the start button not shown used to implement an image reading so that an image reading operation using detected image information from the image sensor 14 is initiated similarly to the example in the first embodiment of this invention. Incidentally, a flag representing that the apparatus is in an image reading operation is raised in the MPU 20 during this image reading operation so that an operation of detecting open/close of the lid unit 34 is not implemented (a YES route at Step D1).

When the image reading apparatus 10D implements an image reading operation, the original feeding unit 11 feeds the original 12 set in the paper feeding hopper 33 one by one, whereas the image sensor 14 receives reflected lights radiated by the illuminating unit 13 onto the original 12 now being fed and outputs an analog signal as detected image information on the basis of an intensity of the reflected incident lights.

Following that, the amplifier 16 amplifies the analog signal as the detected image information from the image sensor 14, the A/D converting unit 17 converts it into a digital signal, then the magnitude comparator 18 converts it into binary information.

Namely, the magnitude comparator 18 compares a level (A) of the detected image information of the digital signal from the A/D converting unit 17 with a slice level (B) set in the register 19. If the detected image information is larger than the slice level, the magnitude comparator 18 detects an image in a position on the original 12 from which reflected lights radiated by the illuminating unit 13 come into as "white", thus outputs a white signal as binary information.

If the detected image information is smaller than the slice level, it means that an image in a position on the original 12 from which lights radiated from the illuminating unit 13 come into is "black" so that a black signal is outputted as the binary information.

As above, the MPU 20 is inputted thereto the binary information of an entire surface of the original 12 via the magnitude comparator 18, the AND circuit 26 and the flip-flop 27, thereby generating and recognizing read image information of the original 12.

After that, when the image reading operation is terminated, a flag representing that the apparatus is in an image reading operation is reset in the MPU 20 so that an operation of detecting open/close of the lid unit 34, that is, the original feeding unit 11, is implemented (a NO route at Step D1).

First, the MPU 20 controls the illuminating unit 13 to be turned on (Step D2), and makes the mark gate signal set form the outside and a slice level signal set in the register 19 be in an enable state (Steps D3 and D4).

The AND circuit 26 performs an AND operation on the binary signal at that time from the magnitude comparator 18 and the mark gate signal set from the outside. The flip-flop 27 outputs detected open/close information of the original feeding unit 11 on the basis of a change in the signal from the AND circuit 26.

Concretely, if the original feeding unit 11 is closed, it is detected as a binary signal from the magnitude comparator 18 that the inner region of the outer peripheral region is "black" (A≦B), whereas an 'H' level signal representing that the outer peripheral region is "white" (A>B) is detected.

As above, the mark gate signal is a digital signal such as to become an 'H' level signal within a region where an image of the outer peripheral region is detected or become an 'L' level signal within the inner region of the outer peripheral region. If the original feeding unit 11 is closed, the AND circuit 26 can output a signal representing that an image is "white" (an 'H' level signal) only when the image sensor 14 reads the outer peripheral region of the feed roller 15A.

The flip-flop 27 outputs an 'H' level signal when a result of the operation becomes an 'H' level signal from an 'L' level signal with the result of the operation as timing information on the basis of a result of the operation from the AND circuit 26, thereby notifying that the original feeding unit 11 is in the close state.

If a result of the operation from the AND circuit 26 remains to be an 'L' level signal, the flip-flop 27 outputs a binary signal (an 'L' level signal) representing that the original feeding unit 11 is in the open state since reflected lights from the outer peripheral region of the feed roller 15A do not come into the image sensor 14.

In other words, if an output from the magnitude comparator 18 is not an 'H' level signal in the next line after the MPU 20 has instructed a start of detection, the flip-flop 27 notifies that the original feeding unit 11 is opened (form a YES route at Step D5 to Step D6). If the output is an 'H' level signal, the flip-flop 27 notifies that the original feeding unit 11 is closed (from a NO route at Step D5 to Step D7).

In the image reading apparatus 10D according to the fourth embodiment of this invention, the MPU 20 can use binary information from the flip-flop 27 as read image information on the occasion of image reading, and use it as information used to detect the open/close state of the original feeding unit 11 on the occasion excepting the image reading. It is therefore possible to detect the open/close state of the original feeding unit 11 using only existing circuits for image reading without causing an increase of the number of parts of the apparatus, suppress an increase of unnecessary cost required to constitute the apparatus, and easily accomplish a hardware structure of the apparatus.

What is claimed is:

1. An image reading apparatus comprising:

an original feeding unit composed of a pair of parts which define a feeding route and are mutually movable to open or close said original feeding unit for feeding an original along said feeding route;

a light radiating unit disposed on one side of said feeding route of said original feeding unit for radiating light on said original being fed by said original feeding unit;

an image sensor disposed on one of the mutually movable parts of said original feeding unit at said one side of said feeding route for detecting an image of said original on the basis of reflected light from said original;

a binary information converting unit for converting information of the detected image from said image sensor into binary information;

a data processing unit for performing a data process using said binary information from said binary information converting unit as read image information when reading the image, and using said binary information as information used to detect an opened/closed posture of said original feeding unit always except when reading the image; and original-back supporting means, constituting the other part of said original feeding unit at least partially and opposite to said light radiating unit and said image sensor with respect to said feeding route, for reflecting light from said light radiating unit to said image sensor, said original-back supporting means being a roller whose at least partial surface reflects light radiated from said light radiating unit, said original-back supporting means being movable relatively with respect to said image sensor in response to the opening and closing of said original feeding unit.

2. The image reading apparatus according to claim 1, wherein said binary information converting unit includes slice level setting means for setting a slice level and comparing means for comparing the slice level set by said slice level setting means with the detected image information from said image sensor, and said binary information converting unit outputs a result of the comparison by said comparing means as said binary information.

3. The image reading apparatus according to claim 2, wherein said slice level setting means comprises a register in which said slice level is previously set.

4. The image reading apparatus according to claim 2, wherein said slice level setting means includes peak value holding means for holding a peak value of detected information lastly inputted from said image sensor and voltage dividing means for dividing a level held in said peak value holding means, whereby said slice level setting means sets a result of the voltage division by said voltage dividing means as the slice level.

5. The image reading apparatus according to claim 1, wherein said binary information converting unit comprises a light radiating time peak value holding means for holding a peak value of detected information from said image sensor obtained while said light radiating unit radiates light and a peak value comparing means for comparing peak value information held in said light reading time peak value holding means with the detected information from said image sensor obtained while said light radiating unit does not radiate light, and said binary information converting unit outputs a result of the comparison by said peak value comparing means as said binary information.

6. The image reading apparatus according to claim 1, wherein an entire surface of said roller of said original-back supporting unit can reflect light radiated from said light radiating unit.

7. The image reading apparatus according to claim 1, wherein said roller has an outer peripheral region covered with a reflective surface which reflects light and an inner region, which is disposed inside of said outer peripheral region in a direction parallel to the axis of said roller, covered with a non-reflective surface which does not reflect light.

8. An image reading apparatus, comprising:

an original feeding unit composed of a pair of parts which define a feeding route and are mutually movable to open or close said original feeding unit for feeding an original along said feeding route;

a light radiating unit disposed on one side of said feeding route of said original feeding unit for radiating light on said original being fed by said original feeding unit;

an image sensor disposed on one of the mutually movable parts of said original feeding unit at said one side of said feeding route for detecting an image of said original on the basis of reflected light from said original;

a binary information converting unit for converting information of the detected image from said image sensor into binary information;

a data processing unit for performing a data process using said binary information from said binary information converting unit as read image information when reading the image, and using said binary information as information to detect an opened/closed posture of said original feeding unit always except when reading the image; and original-back supporting means, constituting the other part of said original feeding unit at least partially and opposite to said light radiating unit and said image sensor with respect to said feeding route, for reflecting light from said light radiating means to said image sensor, at least part of said original-back supporting means having an outer peripheral region covered with a reflective surface which reflects light and an inner region, which is disposed inside of said outer peripheral region, covered with a non-reflective surface which does not reflect light.

9. The image reading apparatus according to claim 8, wherein said binary information converting unit includes slice level setting means for setting a slice level and comparing means for comparing the slice level set by said slice level setting means with the detected image information from said image sensor, and said binary information converting unit outputs a result of the comparison by said comparing means as said binary information.

10. The image reading apparatus according to claim 9, wherein said slice level setting means comprises a register in which said slice level is previously set.

11. The image reading apparatus according to claim 9, wherein said slice level setting means comprises a peak value holding means for holding a peak value of detected information lastly inputted from said image sensor and a voltage dividing means for dividing a level held in said peak value holding means, and said slice level setting means sets a result of the voltage division by said voltage dividing means as the slice level.

12. The image reading apparatus according to claim 8, wherein said binary information converting unit comprises a light radiating time peak value holding means for holding a peak value of detected information from said image sensor obtained while said light radiating unit radiates light and a peak value comparing means for comparing peak value information held in said light radiating time peak value holding means with the detected information from said image sensor obtained while said light radiating unit does not radiate light, and said binary information converting unit outputs a result of the comparison by said peak value comparing means as said binary information.

13. A method for detecting an opened/closed posture of an original feeding unit in an image reading apparatus including said original feeding unit composed of a pair of parts, which defines a feeding route and are mutually movable to open or close said original feeding unit, for feeding an original along said feeding route, a light radiating unit disposed on one side of said feeding route of said original feeding unit for radiating light on said original being fed by said original feeding unit, an image sensor disposed on one of the mutually movable parts of said original feeding unit for detecting an image of said original on the basis of reflected light from said original, a binary information converting unit for converting information of the detected image from said image sensor into binary information, and original-back supporting means, constituting the other part of said original feeding unit at least partially and opposite to said light radiating unit and said image sensor with respect to said feeding route, for reflecting light from said light radiating unit to said image sensor, said original-back supporting means being a roller having a reflective surface, said method comprising the steps of:

using binary information converted on the basis of magnitudes of the detected image information from said image sensor and a slice level set in said binary information converting unit as read image information when reading the image; and discriminating said detected image information obtained while said light radiating unit is turned on with said slice level in said binary information converting unit always except when reading the image, such that if said detected image information is smaller or lower than said slice level, it is detected that said original feeding unit is in an opened posture, whereas if said detected image information is larger or higher than said slice level, it is detected that said original feeding unit is in a closed posture.

14. A method for detecting an opened/closed posture of an original feeding unit in an image reading apparatus including said original feeding unit composed of a pair of parts, which defines a feeding route and are mutually movable to open or close said original feeding unit, for feeding an original along said feeding route, a light radiating unit disposed on one side of said feeding route of said original feeding unit for radiating light on said original being fed by said original feeding unit, an image sensor disposed on one of the mutually movable parts of said original feeding unit for detecting an image of said original on the basis of reflected light from said original, a binary information converting unit for converting information of the detected image from said image sensor into binary information, and original-back supporting means, constituting the other part of said original feeding unit at least partially and opposite to said light radiating unit and said image sensor with respect to said feeding route, for reflecting light from said light radiating unit to said image sensor, said original-back supporting means being a roller having a reflective surface, said method comprising the steps of:

using binary information converted on the basis of magnitudes of the detected image information from said image sensor and a slice level set in said binary information converting unit as read image information when reading the image;

discriminating said detected image information obtained while said light radiating unit is turned off with said slice level in said binary information converting unit always except when reading into the image, such that if said detected image information is larger or higher than said slice level, it is detected that said original feeding unit is in an open posture, whereas if said detected image information is smaller or lower than said slice level, it is detected that said original feeding unit is in a closed posture.

15. A method for detecting an opened/closed posture of an original feeding unit in an image reading apparatus including said original feeding unit composed of a pair of parts, which defines a feeding route and are mutually movable to open or close said original feeding unit, for feeding an original along said feeding route, a light radiating unit disposed on one side of said feeding route of said original feeding unit for radiating light on said original being fed by said original feeding unit, an image sensor disposed on one side of the mutually movable parts of said original feeding unit for detecting an image of said original on the basis of reflected light from said original, a binary information converting unit for converting information of the detected image from said image sensor into binary information, and original-back supporting means, constituting the other part of said original feeding unit at least partially and opposite to said light radiating unit and said image sensor with respect to said feeding route, for reflecting light from said light radiating unit to said image sensor, said original-back supporting means being a roller having a reflective surface, said method comprising the steps of:

holding a peak value of detected information from said image sensor obtained while said light radiating unit radiates light in said binary information converting unit, comparing said peak value information with the detected image information from said image sensor obtained while said light radiating unit does not radiate light; and if said detected image information is substantially equal to said peak value information, detecting that said original feeding unit is in an opened posture, whereas if said detected image information is smaller than said peak value information, detecting that said original feeding unit is in a closed posture, on the basis of a result of the comparison from said binary information converting unit always except when reading the light.

16. A method for detecting an opened/closed posture of an original feeding unit in an image reading apparatus including said original feeding unit composed of a pair of parts, which defines a feeding route and are mutually movable to open or close said original feeding unit, for feeding an original along said feeding route, a light radiating unit disposed on one side of said feeding route of said original feeding unit for radiating light on said original being fed by said original feeding unit, an image sensor disposed on one of the mutually movable parts of said original feeding unit for detecting an image of said original on the basis of reflected light from said original, a binary information converting unit for converting information of the detected image from said image sensor into binary information, and original-back supporting means, constituting the other part of said original feeding unit at least partially and opposite to said light radiating unit and said image sensor with respect to said feeding route, for reflecting light from said light radiating unit to said image sensor, at least part of said original-back supporting means having an outer peripheral region covered with a reflective surface which reflects light and an inner region, which is disposed inside of said outer peripheral region, covered with a non-reflective surface which does not reflect light, said method comprising the steps of:

using binary information converted on the basis of magnitudes of the detected image information from said image sensor and a slice level set in said binary information converting unit as read image information when reading the image; and discriminating said detected image information obtained while said light radiating unit is turned on with said slice level in said binary information converting unit always except when reading the image, such that if said detected image information is smaller or lower than said slice level, it is detected that said original feeding unit is in an opened posture, whereas if said detected image information is larger or higher than said slice level, it is detected that said original feeding unit is in a closed posture.

17. A method for detecting an opened/closed posture of an original feeding unit in an image reading apparatus including said original feeding unit composed of a pair of parts, which defines a feeding route and are mutually moveable to open or close said original feeding unit, for feeding an original along said feeding route, a light radiating unit disposed on one side of said feeding route of said original feeding unit for radiating light on said original being fed by said original feeding unit, an image sensor disposed on one of the mutually movable parts of said original feeding unit for detecting an image of said original on the basis of reflected light from said original, a binary information converting unit for converting information of the detected image from said image sensor into binary information, and original-back supporting means, constituting the other part of said original feeding unit at least partially and opposite to said light radiating unit and said image sensor with respect to said feeding route, for reflecting light from said light radiating unit to said image sensor, at least part of said original-back supporting means having an outer peripheral region covered with a reflective surface which reflects light and an inner region, which is disposed inside of said outer peripheral region, covered with a non-reflective surface which does not reflect light, said original-back supporting means being a roller having a reflective surface, said method comprising the steps of:

using binary information converted on the basis of magnitudes of the detected image information from said image sensor and a slice level set in said binary information converting unit as read image information when reading the image;

discriminating said detected image information obtained while said light radiating unit is turned off with said slice level in said binary information converting unit always except when reading into the image, such that if said detected image information is larger or higher than said slice level, it is detected is made that said original feeding unit is in an opened posture, whereas if said detected image information is smaller or lower than said slice level, it is detected that said original feeding unit is in a closed posture.

18. A method for detecting an opened/closed posture of an original feeding unit in an image reading apparatus including said original feeding unit composed of a pair of parts, which defined a feeding route and are mutually movable to open or close said original feeding unit, for feeding an original along said feeding route, a light radiating unit disposed on one side of said feeding route of said original feeding unit for radiating light on said original being fed by said original feeding unit, an image sensor disposed on one of the mutually movable parts of said original feeding unit for detecting an image of said original on the basis of reflected light from said original, a binary information converting unit for converting information of the detected image from said image sensor into binary information, and original-back supporting means, constituting the other part of said original feeding unit at least partially and opposite to said light radiating unit and said image sensor with respect to said feeding route, for reflecting light from said light radiating unit to said image sensor, at least part of said original-back supporting means having an outer peripheral region covered with a reflective surface which reflects light and an inner region, which is disposed inside of said outer peripheral region, covered with a non-reflective surface which does not reflect light, said original-back supporting means being a roller having a reflective surface, said method comprising the steps of:

holding a peak value of detected information from said image sensor obtained while said light radiating unit radiates light in said binary information converting unit, comparing said peak value information with the detected image information from said image sensor obtained while said light radiating unit does not radiate light; and if said detected image information is substantially equal to said peak value information, detecting that said original feeding unit is in an opened posture, whereas if said detected image information is smaller than said peak value information, detecting that said original feeding unit is in a closed posture, on the basis of a result of the comparison from said binary information converting unit always except when reading the light.

* * * * *